(12) United States Patent
Vizen et al.

(10) Patent No.: US 10,675,833 B2
(45) Date of Patent: Jun. 9, 2020

(54) MULTILAYERED INJECTION MOLDED INTERLACE-LIKE ARTICLE AND METHOD FOR MOLDING SAME

(71) Applicant: KETER PLASTIC LTD., Herzliya (IL)

(72) Inventors: Nimrod Vizen, Herzliya (IL); Nisim Eliyahu, Holon (IL)

(73) Assignee: KETER PLASTIC LTD., Herzliya (IL)

( * ) Notice: Subject to any disclaimer, the term of this patent is extended or adjusted under 35 U.S.C. 154(b) by 58 days.

(21) Appl. No.: 15/565,257

(22) PCT Filed: Apr. 13, 2016

(86) PCT No.: PCT/IL2016/050390
§ 371 (c)(1),
(2) Date: Oct. 9, 2017

(87) PCT Pub. No.: WO2016/166756
PCT Pub. Date: Oct. 20, 2016

(65) Prior Publication Data
US 2018/0290419 A1 Oct. 11, 2018

Related U.S. Application Data

(60) Provisional application No. 62/146,554, filed on Apr. 13, 2015.

(51) Int. Cl.
*B32B 3/24* (2006.01)
*B32B 3/30* (2006.01)
(Continued)

(52) U.S. Cl.
CPC .............. *B32B 3/266* (2013.01); *B29C 33/42* (2013.01); *B29C 45/16* (2013.01);
(Continued)

(58) Field of Classification Search
None
See application file for complete search history.

(56) References Cited

U.S. PATENT DOCUMENTS 201,285 A 3/1878 Pentlarge
2,586,978 A * 2/1952 Murray ................. B29C 33/123
428/67
(Continued)

FOREIGN PATENT DOCUMENTS

CN 2566701 Y * 8/2003
CN 101058227 A 10/2007
(Continued)

OTHER PUBLICATIONS

Machine Translation of JP 3162772 U, Sep. 2010 (Year: 2010).*
(Continued)

*Primary Examiner* — Jeffrey A Vonch
(74) *Attorney, Agent, or Firm* — Vorys, Sater, Seymour and Pease LLP

(57) ABSTRACT

Provided is a panel, an article including such a panel and method of its manufacture, where the panel includes a base layer having a first face and a second face, integrally sandwiched between a first exterior layer applied over the first face, and a second exterior layer applied over the second face. In addition, the bulging portions of the base layer projecting from the first face and the second face are exposed through respective openings at the first exterior layer and the second exterior layer, extending in register with said bulging portions.

15 Claims, 23 Drawing Sheets

(51) Int. Cl.
| | |
|---|---|
| *B32B 7/02* | (2019.01) |
| *B29C 45/16* | (2006.01) |
| *B29C 45/26* | (2006.01) |
| *B32B 25/08* | (2006.01) |
| *B29C 33/42* | (2006.01) |
| *B32B 3/26* | (2006.01) |
| *B32B 3/00* | (2006.01) |
| *B32B 7/022* | (2019.01) |
| *B32B 27/08* | (2006.01) |
| *B29D 28/00* | (2006.01) |
| *B29C 45/37* | (2006.01) |
| *B29C 45/00* | (2006.01) |
| *B32B 3/06* | (2006.01) |
| *B29K 23/00* | (2006.01) |
| *B29L 7/00* | (2006.01) |

(52) U.S. Cl.
CPC ........... *B29C 45/1676* (2013.01); *B32B 3/00* (2013.01); *B32B 3/30* (2013.01); *B32B 7/02* (2013.01); *B32B 7/022* (2019.01); *B32B 25/08* (2013.01); *B29C 45/0003* (2013.01); *B29C 45/162* (2013.01); *B29C 45/1615* (2013.01); *B29C 45/2628* (2013.01); *B29C 45/37* (2013.01); *B29C 2045/0032* (2013.01); *B29C 2045/1678* (2013.01); *B29C 2045/1681* (2013.01); *B29D 28/00* (2013.01); *B29K 2023/12* (2013.01); *B29L 2007/002* (2013.01); *B32B 3/06* (2013.01); *B32B 27/08* (2013.01); *B32B 2250/03* (2013.01); *B32B 2250/24* (2013.01); *B32B 2250/40* (2013.01); *B32B 2323/10* (2013.01); *B32B 2479/00* (2013.01); *B32B 2607/00* (2013.01); *Y10T 428/2457* (2015.01); *Y10T 428/24298* (2015.01); *Y10T 428/24322* (2015.01); *Y10T 428/24612* (2015.01); *Y10T 428/24983* (2015.01)

(56) References Cited

U.S. PATENT DOCUMENTS

| | | | | | |
|---|---|---|---|---|---|
| 3,769,119 | A | * | 10/1973 | Mizell | D04H 1/552 156/209 |
| 4,849,145 | A | * | 7/1989 | Hirsch | A44B 11/06 264/46.4 |
| 5,567,362 | A | * | 10/1996 | Gr un | B29C 45/16 264/1.31 |
| 5,788,247 | A | | 8/1998 | Tensor | |
| 5,956,799 | A | * | 9/1999 | Panaccione | A47L 13/022 15/143.1 |
| 6,199,460 | B1 | * | 3/2001 | Lo | B25G 1/10 81/177.1 |
| 6,206,438 | B1 | * | 3/2001 | Pueyo | B60K 11/08 180/68.6 |
| D446,437 | S | * | 8/2001 | Chen | B60K 11/08 D8/107 |
| 6,341,712 | B1 | * | 1/2002 | Huang | B65D 81/3874 220/602 |
| 6,464,920 | B1 | * | 10/2002 | Kramer | B29C 45/16 15/143.1 |
| 6,473,939 | B1 | * | 11/2002 | Stegmaier | B25G 1/10 16/114.1 |
| 6,662,406 | B2 | * | 12/2003 | Shonfeld | A01B 1/00 16/430 |
| D569,012 | S | * | 5/2008 | Ellis | B25G 1/00 D25/138 |
| D597,332 | S | * | 8/2009 | Carmon | A47C 7/425 D6/369 |
| D618,928 | S | * | 7/2010 | Carmon | B29C 45/1615 D6/369 |
| D671,752 | S | * | 12/2012 | Anderson | A47C 5/12 D5/47 |
| D681,349 | S | * | 5/2013 | Anderson | B25G 1/00 D5/43 |
| D681,350 | S | * | 5/2013 | Anderson | B29C 45/0017 D5/43 |
| 8,545,651 | B1 | * | 10/2013 | Jong | B32B 37/12 156/307.3 |
| D694,023 | S | * | 11/2013 | Thuma | B29C 45/16 D5/43 |
| D694,526 | S | * | 12/2013 | Anderson | B65D 81/3874 D5/43 |
| 8,658,269 | B1 | * | 2/2014 | Parkes | B29C 45/14786 428/156 |
| D701,048 | S | * | 3/2014 | Fischer, Jr. | D5/43 |
| D707,108 | S | * | 6/2014 | Fischer, Jr. | B60K 11/08 D8/359 |
| D730,068 | S | * | 5/2015 | Thuma | A47L 13/022 D6/336 |
| D757,451 | S | * | 5/2016 | Brownrigg | A44B 11/06 D5/56 |
| 2002/0171169 | A1 | * | 11/2002 | Chuang | B29C 45/1671 264/247 |
| 2004/0091675 | A1 | | 5/2004 | Yang | |
| 2005/0115023 | A1 | * | 6/2005 | Lin | B25G 1/00 16/110.1 |
| 2006/0186574 | A1 | * | 8/2006 | Jen | B29C 45/0017 264/250 |
| 2008/0164744 | A1 | * | 7/2008 | Wang | A47C 5/12 297/452.18 |
| 2011/0104434 | A1 | * | 5/2011 | Masanek, Jr. | E01C 5/226 428/137 |
| 2011/0129623 | A1 | * | 6/2011 | Haimoff | A47C 5/12 428/32 |
| 2012/0217785 | A1 | | 8/2012 | Nusbaher | |
| 2012/0223516 | A1 | * | 9/2012 | Waumans | B42D 25/00 283/85 |
| 2012/0291882 | A1 | * | 11/2012 | Vogler | B65H 75/40 137/355.2 |
| 2013/0047528 | A1 | * | 2/2013 | Masanek, Jr. | B29C 45/1676 52/177 |
| 2013/0139329 | A1 | * | 6/2013 | Ferniani | A43B 7/08 12/128 R |
| 2015/0010183 | A1 | | 1/2015 | Van Dijk et al. | |
| 2015/0130233 | A1 | * | 5/2015 | Thuma | B29C 49/0031 297/188.1 |
| 2016/0023504 | A1 | * | 1/2016 | Shapiro | A47G 21/04 30/526 |

FOREIGN PATENT DOCUMENTS

| | | | | |
|---|---|---|---|---|
| CN | 103300622 | A | * | 9/2013 |
| CN | 103300622 | A | | 9/2013 |
| CN | 103494459 | A | | 1/2014 |
| DE | 102007018358 | A1 | * | 10/2008 ............ B65D 1/243 |
| EP | 1431193 | A2 | * | 6/2004 ............ B65D 1/243 |
| EP | 1642698 | A2 | * | 4/2006 ........... B29C 45/572 |
| EP | 2 837 479 | A1 | | 2/2015 |
| FR | 2700455 | A1 | * | 7/1994 ............ A47C 5/12 |
| GB | 2255894 | A | * | 11/1992 ........... A44C 5/0053 |
| JP | 3162772 | U | * | 9/2010 |
| WO | 2009/144703 | A1 | | 12/2009 |
| WO | WO-2010000556 | A1 | * | 1/2010 ............ B29C 45/16 |
| WO | WO-2011018803 | A1 | * | 2/2011 ............ B29C 45/16 |
| WO | 2015/010183 | A1 | | 1/2015 |

OTHER PUBLICATIONS

Machine Translation of FR-2700455-A1, Jul. 1994 (Year: 1994).*
Machine Translation of CN-2566701-Y, Aug. 2003 (Year: 2003).*
Armless Plastic Rattan Chair Mould Manufacture in China, Specification: ISO9001: 2008, retrieved from Internet Jan. 2, 2018, http://caozhenmould.en.made-in-china.com/product/EKancYjCZiWd/

(56) References Cited

OTHER PUBLICATIONS

China-Armless-Plastic-Rattan-Chair-Mould-Manufacture-in-China.html.

* cited by examiner

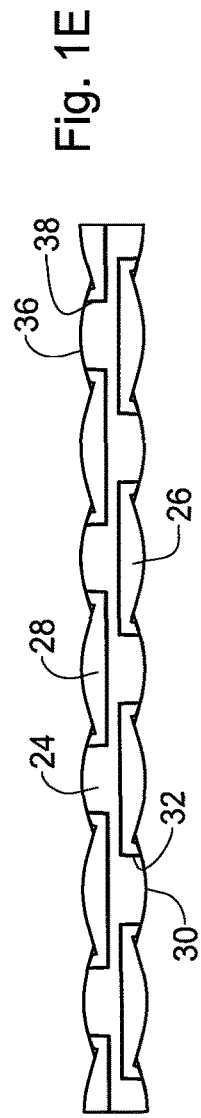
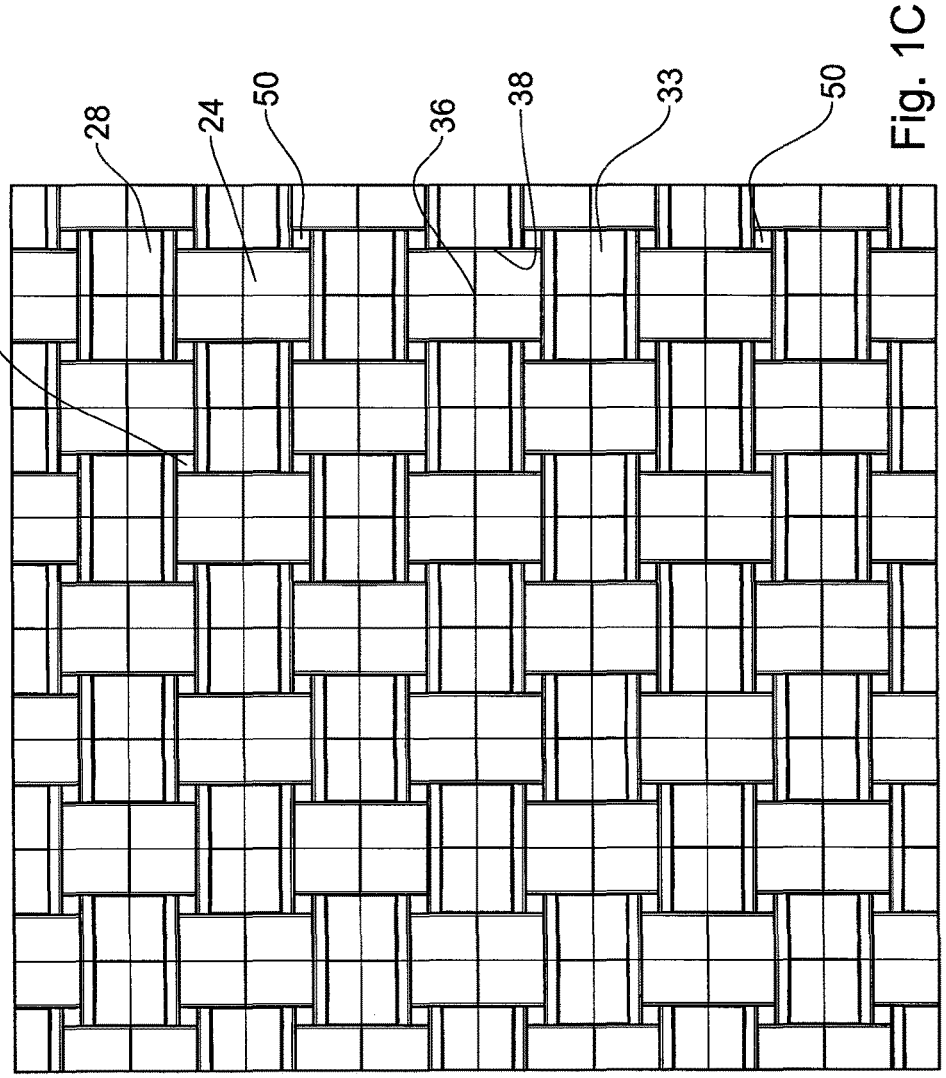
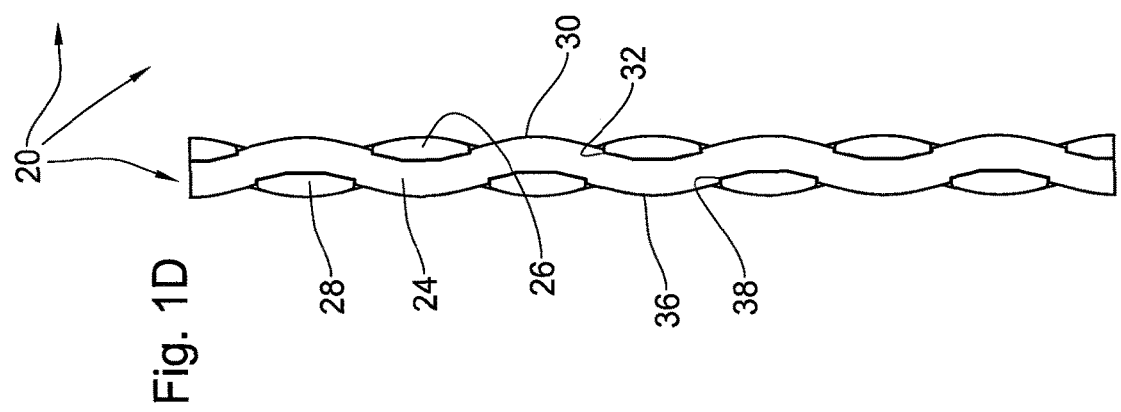

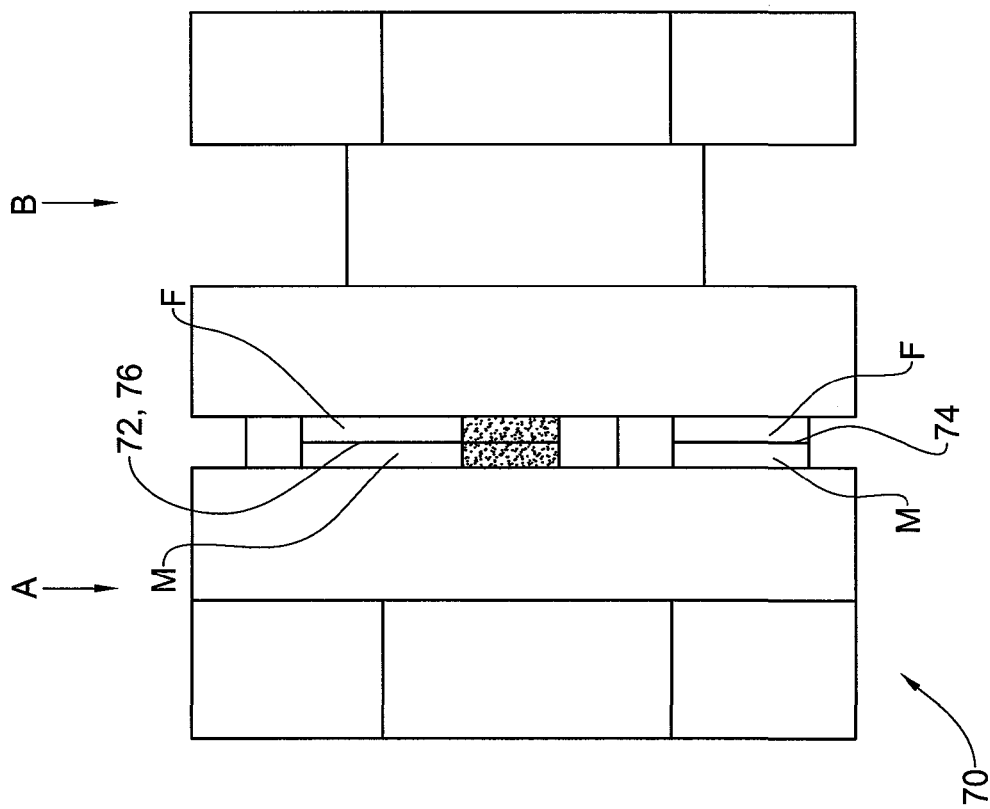
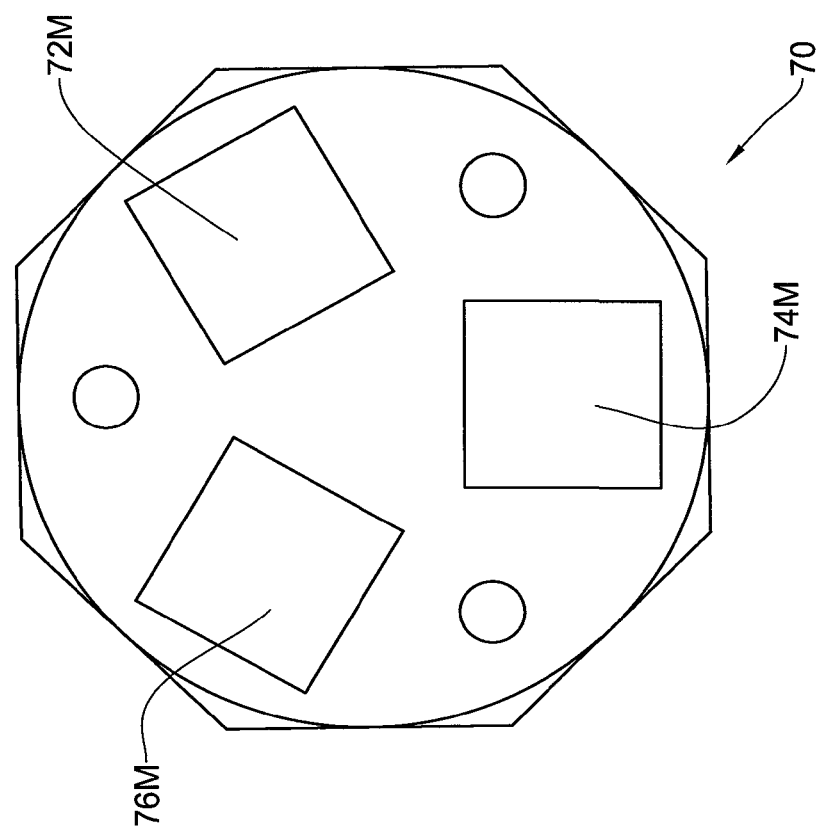
Fig. 9B
Fig. 9A

MULTILAYERED INJECTION MOLDED INTERLACE-LIKE ARTICLE AND METHOD FOR MOLDING SAME

TECHNOLOGICAL FIELD

The presently disclosed subject matter is generally in the field of multilayered injection molding. More particularly the disclosure is directed to interlace-like injection molded articles, mimicking a planer woven panel, and a method for manufacturing same.

The term 'interlace-like article' as used hereinafter is used in its broad sense and denotes panels and articles of manufacture having the appearance of a 3-dimensional woven panel (i.e. resembling a wickerwork panel), e.g. rattan-like panels and articles.

Acknowledgement of the references herein is not to be inferred as meaning that these are in any way relevant to the patentability of the presently disclosed subject matter.

BACKGROUND

WO2009144703 is directed to a molded panel resembling a natural whicker work panel, the panel comprising a plurality of warp and weft strands interlacing the warp strands, such that at locations where warp and weft strands intersect they form together an integrated, solid molded material location.

GENERAL DESCRIPTION

A first aspect of the present disclosure concerns an injection molded panel having the appearance of an interlaced-like panel, resembling a wickerwork panel of material.

A second aspect of the present disclosure concerns an article made of or comprising an injection molded panel having the appearance of an interlaced-like panel.

According to a third aspect there is disclosed a method for injection molding an interlaced-like panel.

A panel according to the present disclosure comprises a base layer having a first face and a second face, integrally sandwiched between a first exterior layer applied over the first face, and a second exterior layer applied over the second face, wherein bulging portions of the base layer projecting from the first face and the second face are exposed through respective openings at the first exterior layer and the second exterior layer, extending in register with said bulging portions.

The panel of the disclosure, according to an example thereof, can be configured with apertures (see-through' openings) extending in register through the base layer and the sandwiching first exterior layer and second exterior layer. The arrangement being such that each such aperture at the first exterior layer and the second exterior layer is defined between ribs of material.

The bulging portions of the base layer can be disposed over the first face and the second face at a uniform orientation or at a warp and weft orientation where openings of the first exterior layer and the second exterior layer are disposed respectively. Said openings at each of the first exterior layer and the second exterior layer are disposed between bulges, disposed over respective external face of the first exterior layer and the second exterior layer.

Bulges of the first exterior layer and the second exterior layer are interconnected through ribs facilitating flow of molten material during an injection molding process. Said ribs, according to a particular configuration, are boundaries of the apertures formed at each of the first exterior layer and the second exterior layer.

The ribs extend between bulges configured over external faces of the first exterior layer and the second exterior layer.

According to a particular example the apertures are rectangular, though they can assume other configurations as well.

The base layer can be made of a first material and the each of the first exterior layer and the second exterior layer can be made of either same or other materials, however configured for adequate adhering to the first face and second face of the base layer. Adhering takes place, according to an embodiment of the disclosure, through injection molding, though other forms of adhesion can be utilized, such as heat welding, adhesive agents and the like.

Furthermore, it is appreciated that the base layer, the first exterior layer and the second exterior layer can assume different properties. For example, the layers can have different colors, different thickness, different external textures, and different mechanical properties.

The first exterior layer and the second exterior layer can be identical (though disposed in a back to back orientation), or can be rotated about an axis normal to a plane of the panel. Said first exterior layer and the second exterior layer can have identical or different properties, as discussed above (e.g. as far as material, thickness, color, shape, texture and orientation).

According to a particular example, the base layer can be made of a rigid material (e.g. PP—polypropylene), whilst one or both of the first exterior layer and the second exterior layer can be made of a more resilient material such as elastomeric materials (e.g. rubber or SEBS—styrene ethylene butylene styrene), imparting the panel with some flexibility. This can render it suitable, for example, for portions of furniture (e.g. seating and/or backing of a chair, etc.).

The panel can be planar or shaped. For example, in case of a basket it can assume a cylindrical shape, in case of a furniture element it can assume a flat or an ergonomic shape, etc.

The second aspect of the present disclosure concerns an article made of or comprising one or more panel portions, said panel portion comprises a base layer having a first face and a second face, integrally sandwiched between a first exterior layer applied over the first face, and a second exterior layer applied over the second face, wherein bulging portions of the base layer projecting from the first face and the second face are exposed through respective openings at the first exterior layer and the second exterior layer, extending in register with said bulging portions.

The article can be for example a furniture item, such as a chair, stool, sofa and the like, or a chest of drawers, or a cupboard, bowls and containers of different shapes and size and configured for various purposes.

The method for manufacturing a panel according to the disclosure comprises the 5 following steps, carried out in an injection molding machine configured for three layer injection:

a) Injecting a first exterior layer, said first exterior layer configured with an exterior face and an interior face and configured with a plurality of openings;

b) Injecting a base layer over the first exterior layer, said base layer configured with a first face and a second face which in turn are configured with bulging portions, wherein the first face of the base layer adheres to the interior face of the first exterior layer; and c) Injecting a second exterior layer over a second face of the base layer, said second exterior layer configured with an exterior face and an interior face and is configured with a plurality of openings, thereby obtaining a panel, wherein bulging portions of the base layer projecting from the first face and the second face are exposed through respective openings at the first exterior layer and the second exterior layer, respectively extending in register with said bulging portions.

According to one configuration, the injection molding machine can be a rotary mold configured with three molding stations, each configured in turn with a male/female arrangement and an injection array; said injection molding machine rotatable about 120° and wherein each time the molds rotate an injection process takes place.

According to another configuration, the injection molding machine comprises a linear array of molding stations.

BRIEF DESCRIPTION OF THE DRAWINGS

In order to better understand the subject matter that is disclosed herein and to exemplify how it may be carried out in practice, embodiments will now be described, by way of non-limiting examples only, with reference to the accompanying drawings, in which:

FIG. 1C is a schematic planar top view of the panel of FIG. 1A;

FIG. 1D is a left side view of FIG. 1C;

FIG. 1E is a rear side view of FIG. 1C;

FIG. 9A is a schematic top view of a mold useful in the process of molding a panel according to the present disclosure;

FIG. 9B is a schematic side view of FIG. 9A;

DETAILED DESCRIPTION OF EMBODIMENTS

Figure 1A:
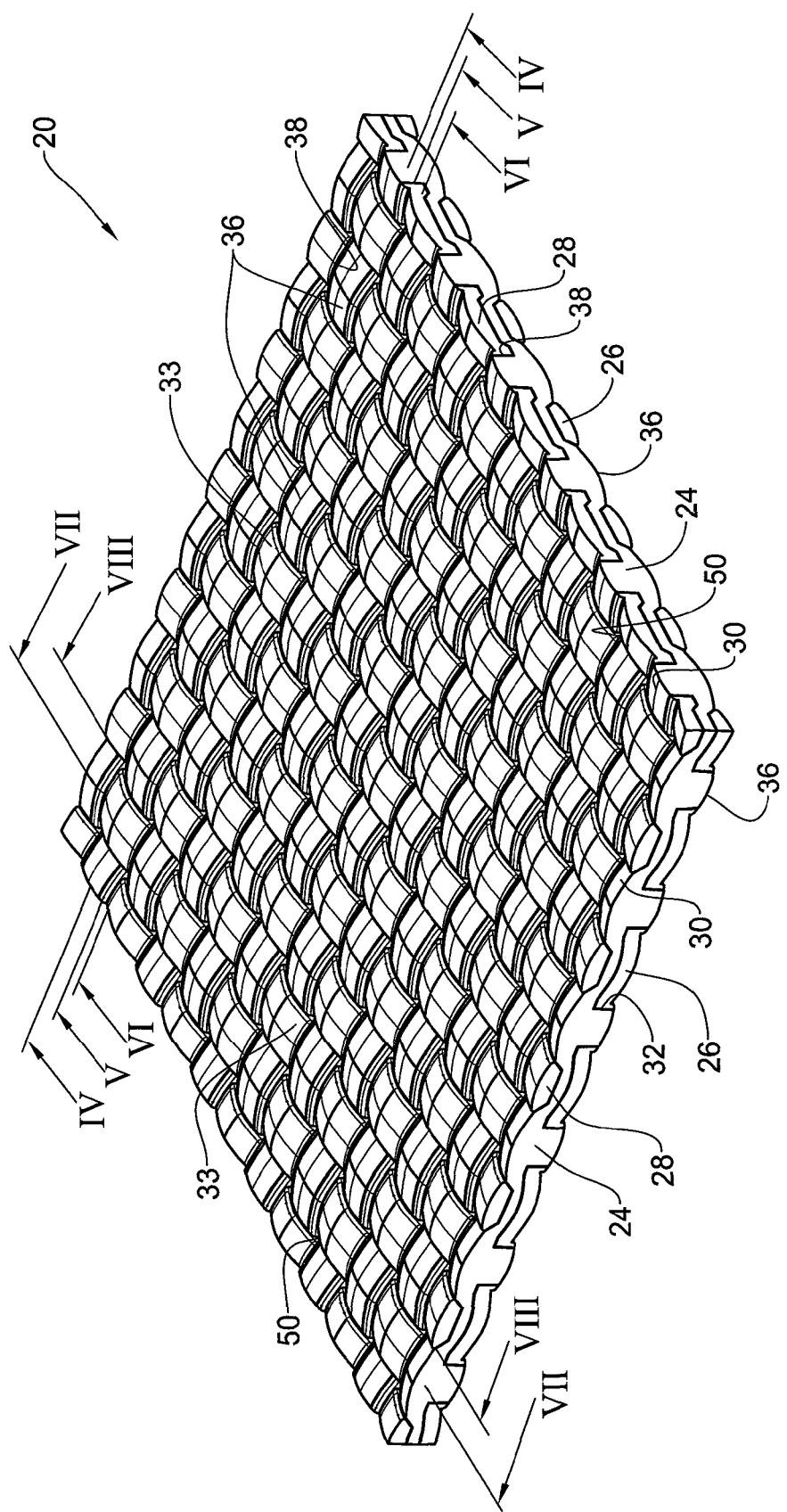
FIG. 1A is a top perspective view of an interlace panel according to an example of the present disclosure.
Figure 1B:
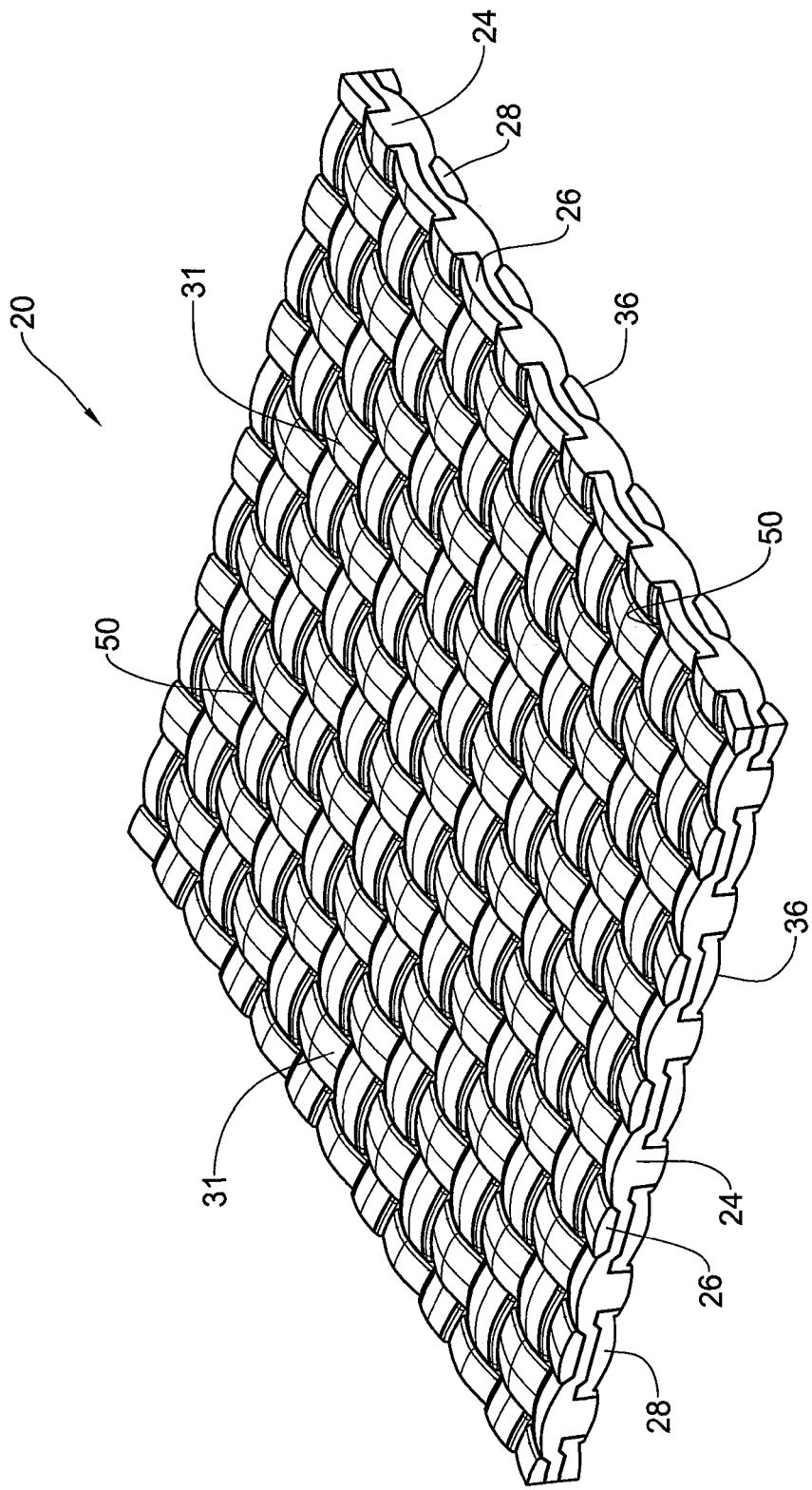
FIG. 1B is a bottom perspective view of the panel of FIG. 1A.
Figure 2:
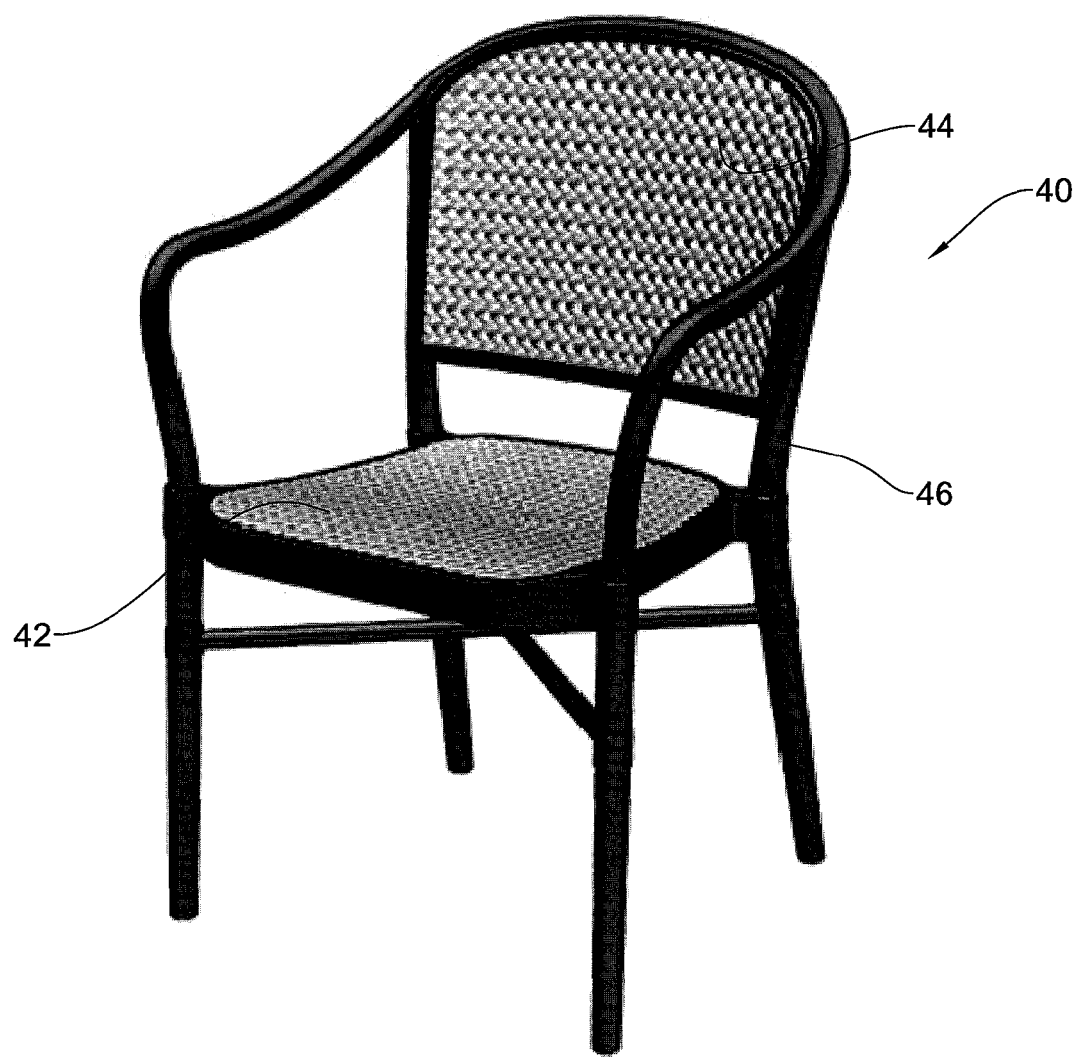
FIG. 2 is an example of a furniture article comprising an interlace panel according to the present disclosure.
Figure 3A:
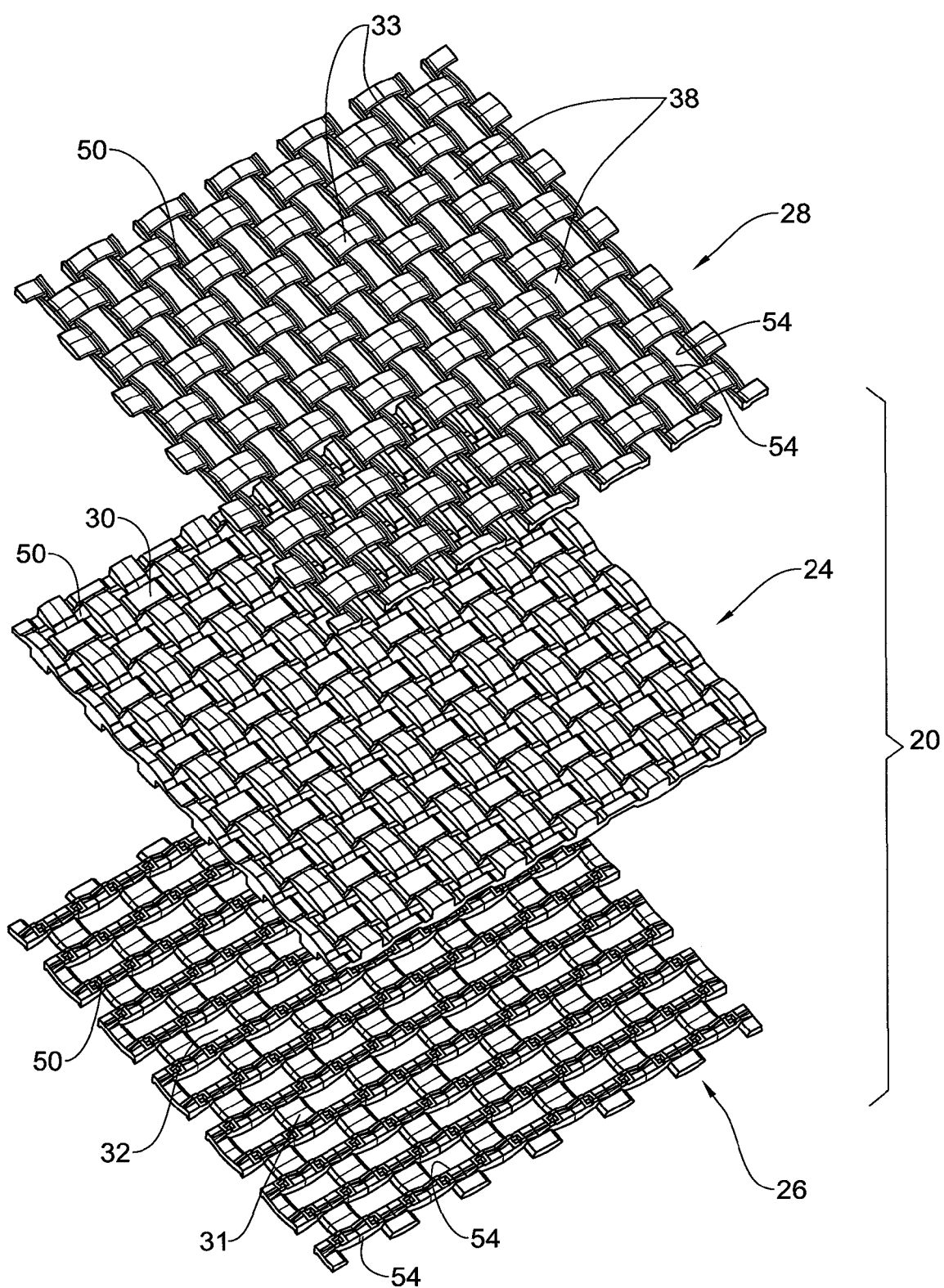
FIG. 3A is a top perspective exploded view of the panel of FIG. 1A.
Figure 3B:
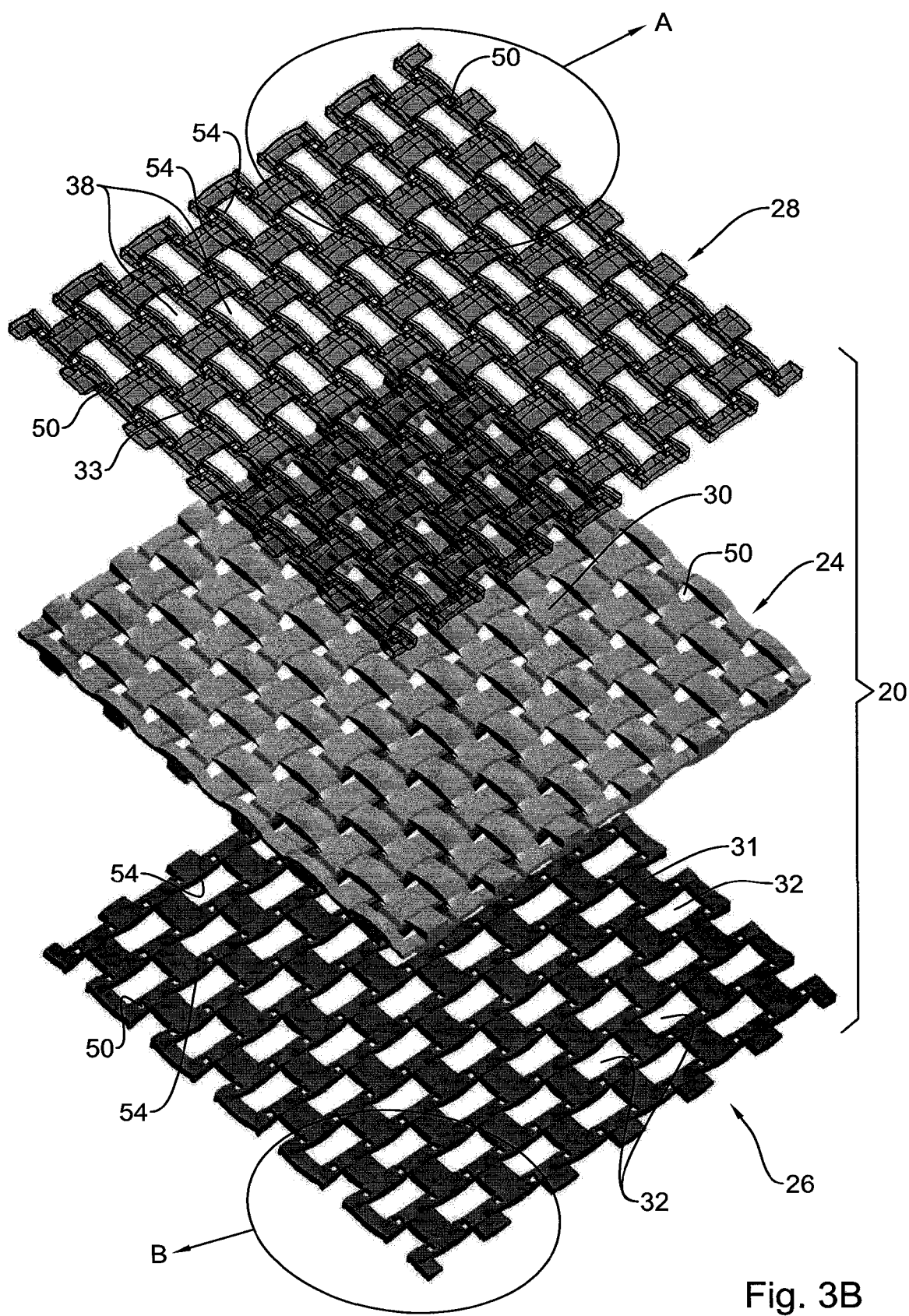
FIG. 3B is a rendering of FIG. 3A.
Figure 3C:
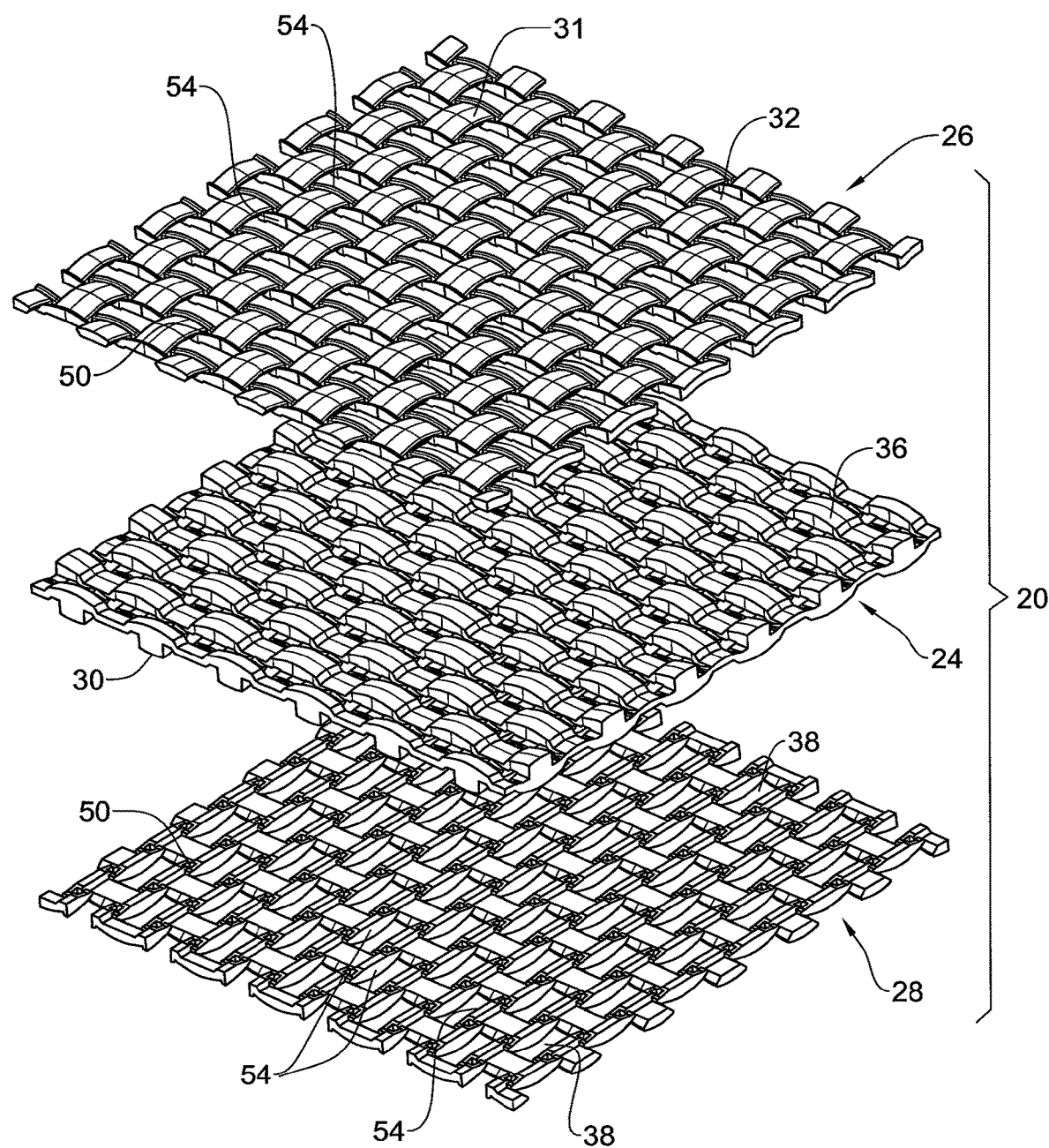
FIG. 3C is a bottom perspective exploded view of the panel of FIG. 1A.
Figure 3D:
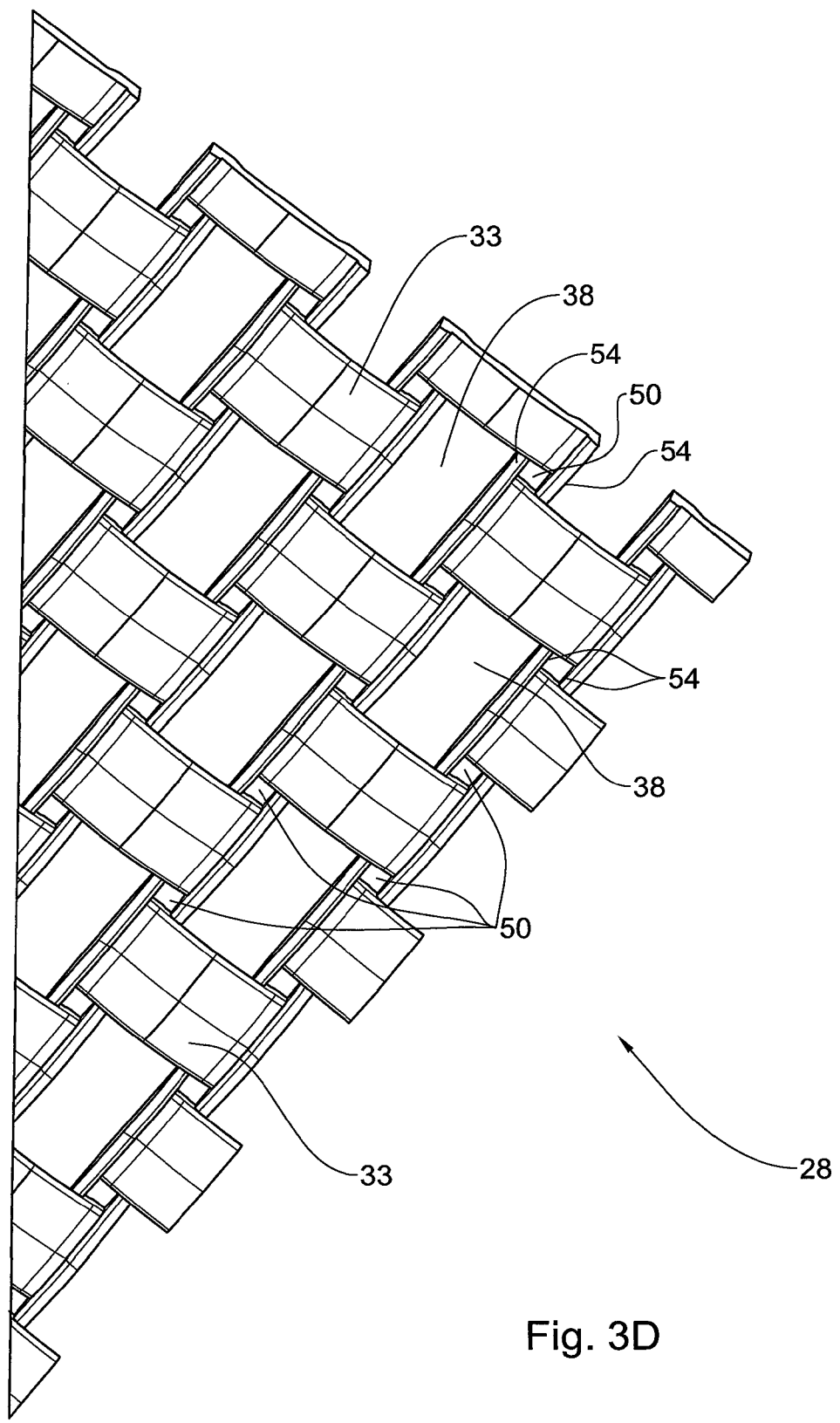
FIG. 3D is an enlargement of the portion marked A in FIG. 3B.
Figure 3E:
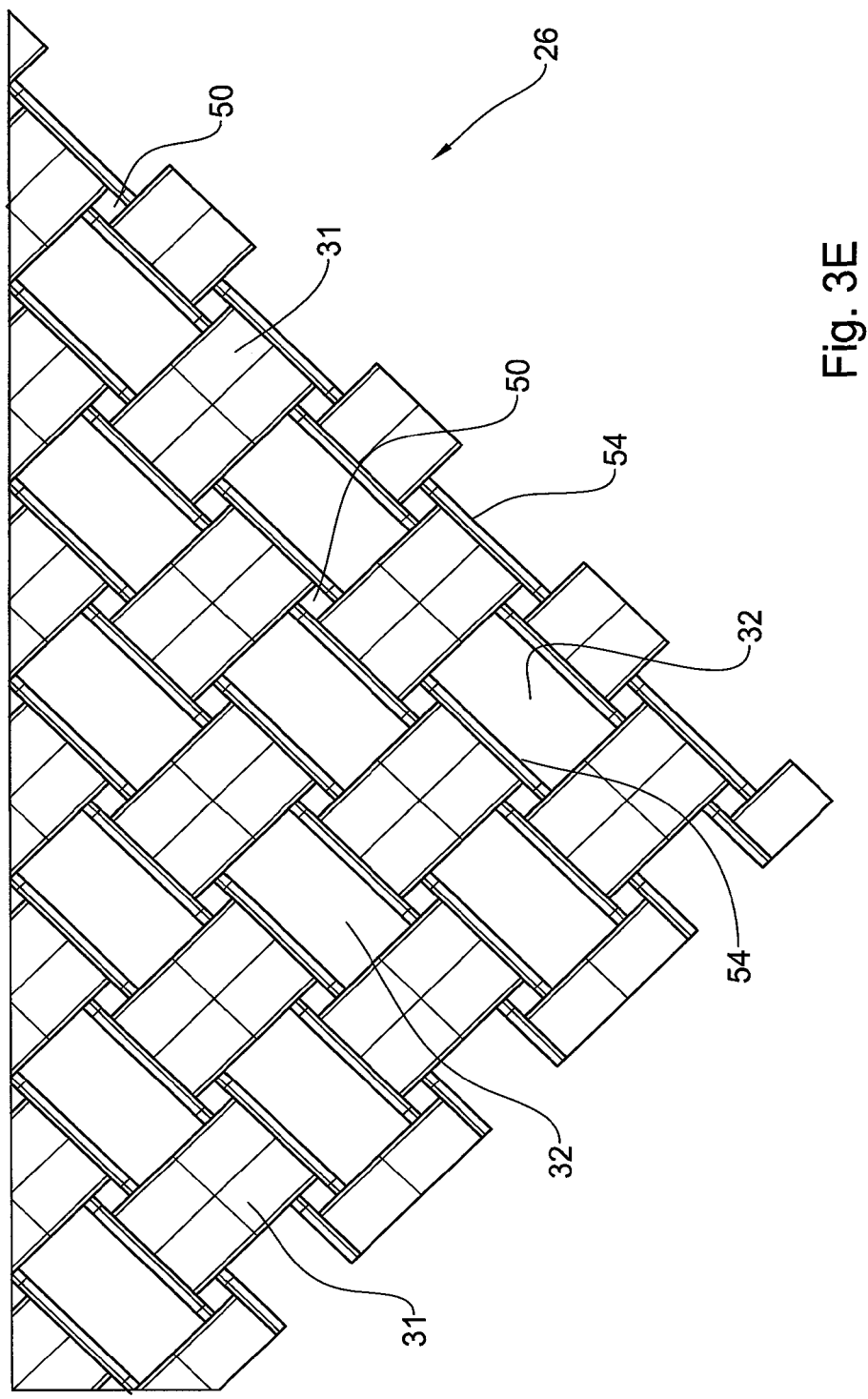
FIG. 3E is an enlargement of the portion marked B in FIG. 3B.
Figure 4A:
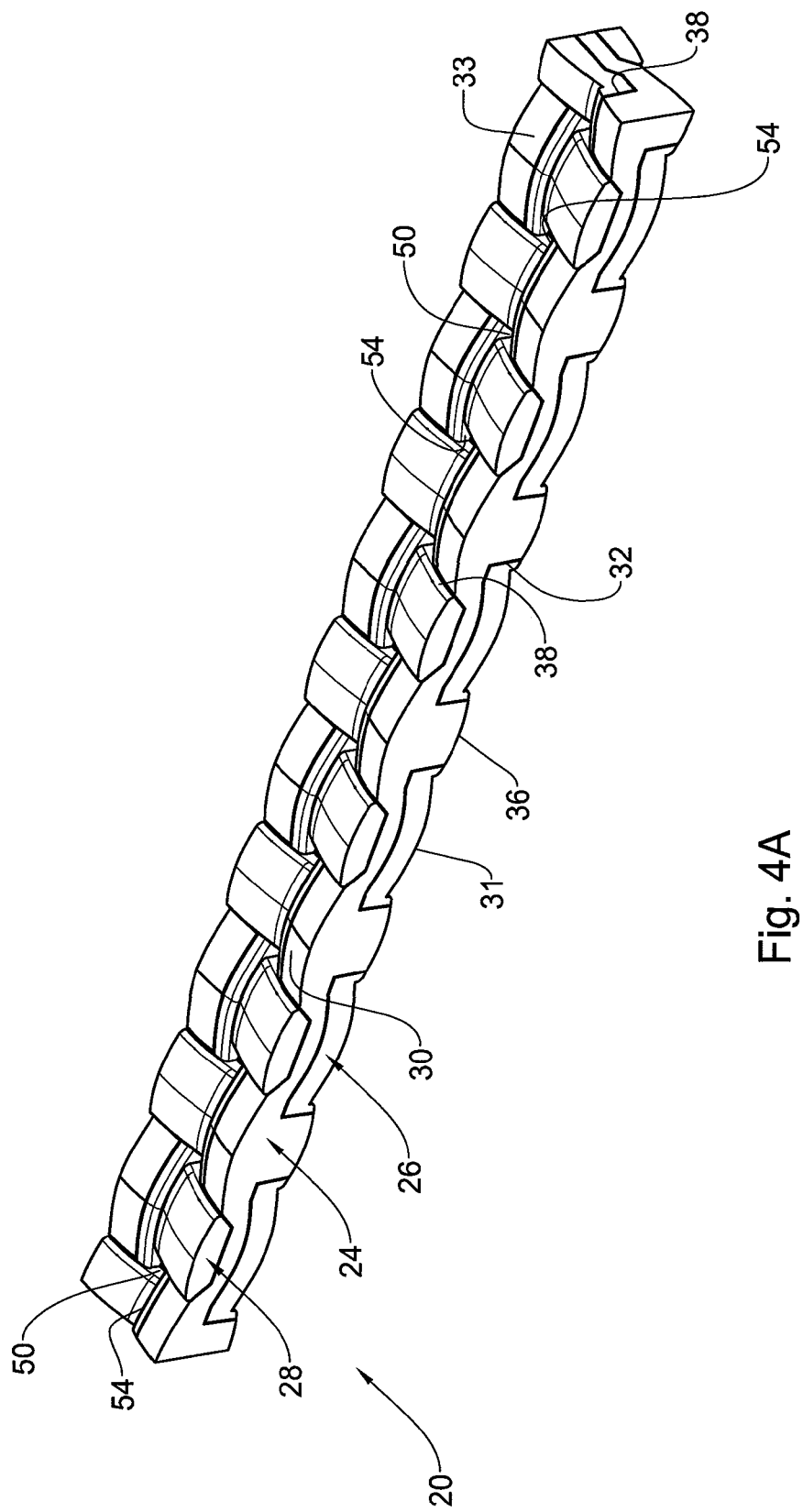
FIG. 4A is a perspective section taken along line IV-IV in FIG. 1A.
Figure 4B:
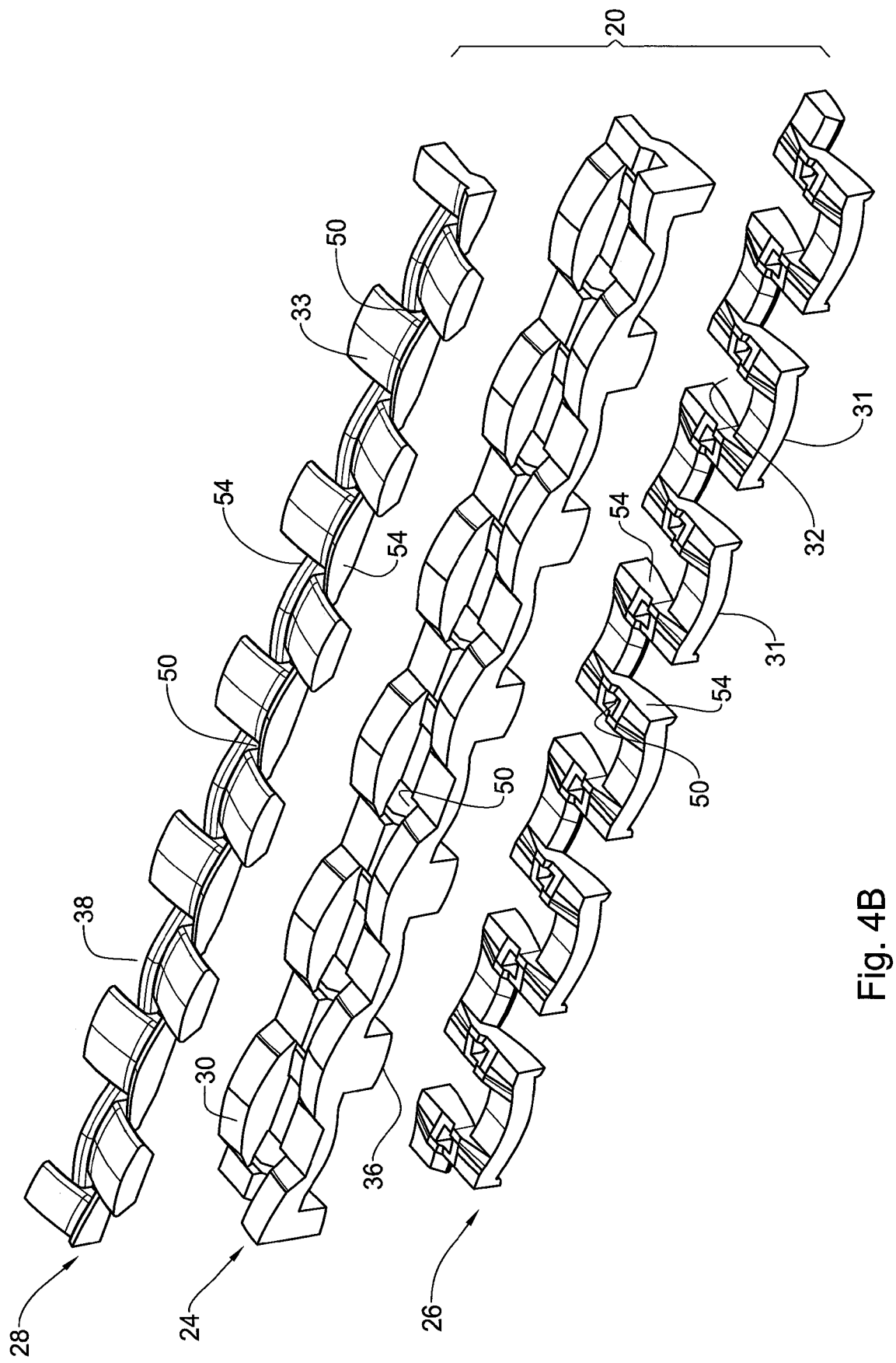
FIG. 4B is an exploded view of FIG. 4A.
Figure 5A:
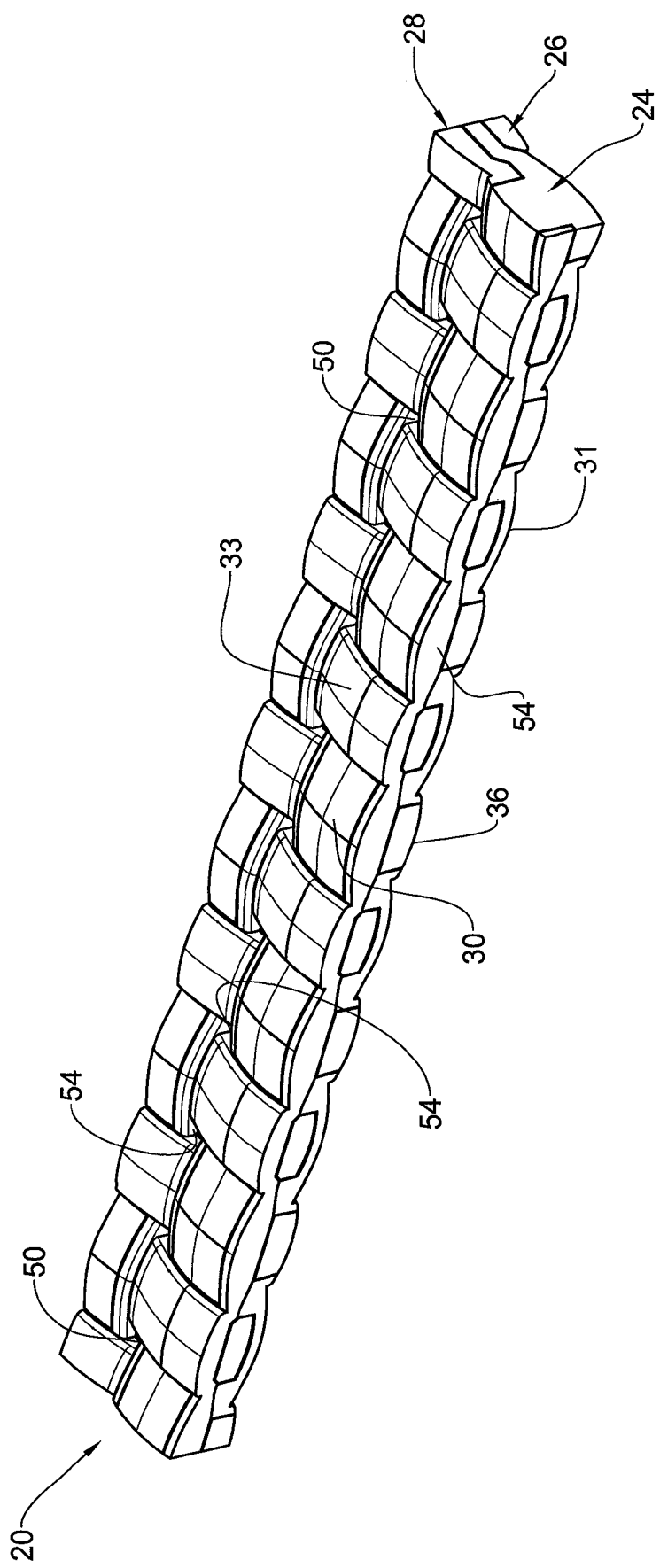
FIG. 5A is a perspective section taken along line V-V in FIG. 1A.
Figure 5B:
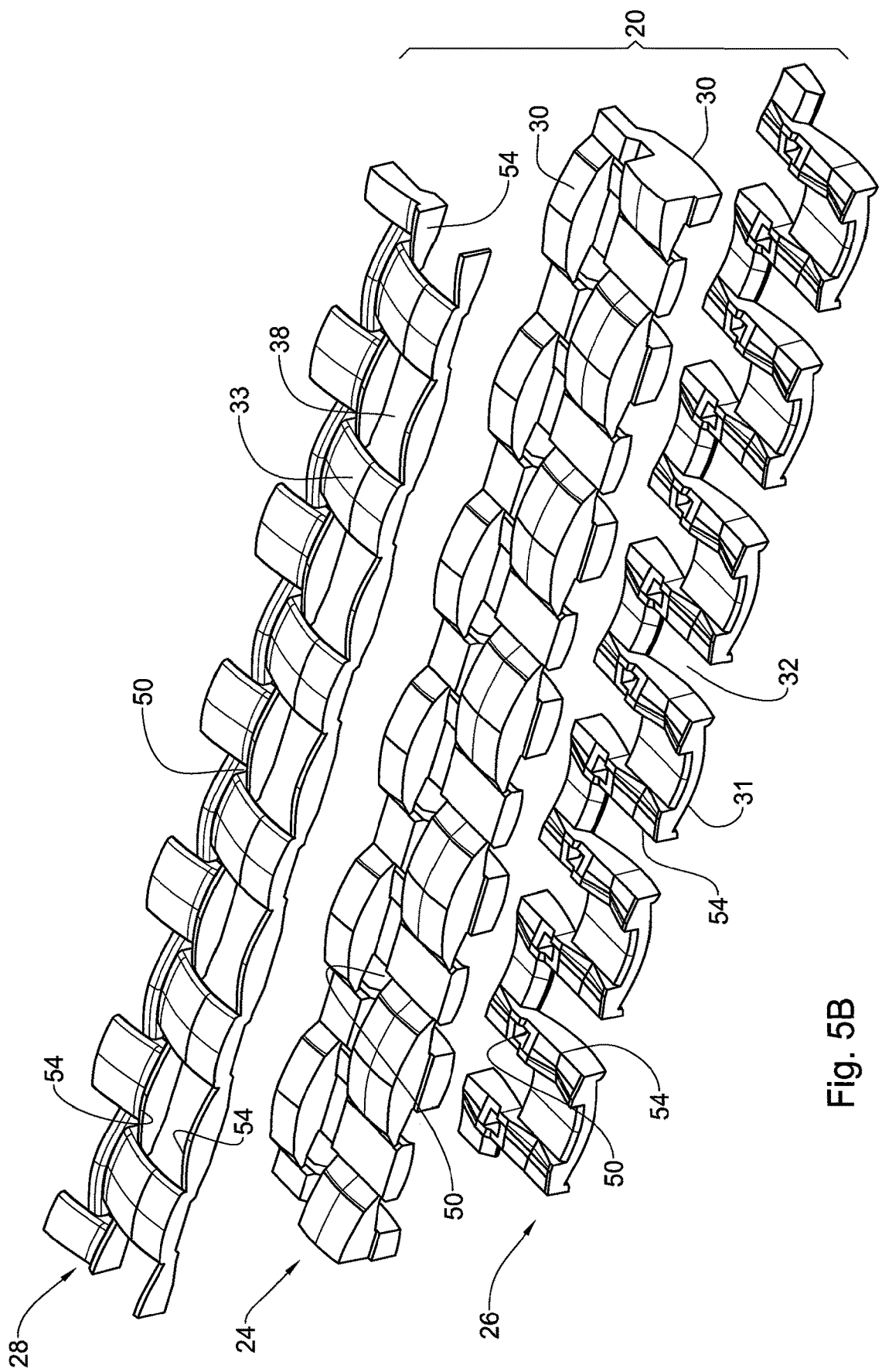
FIG. 5B is an exploded view of FIG. 5A.
Figure 6A:
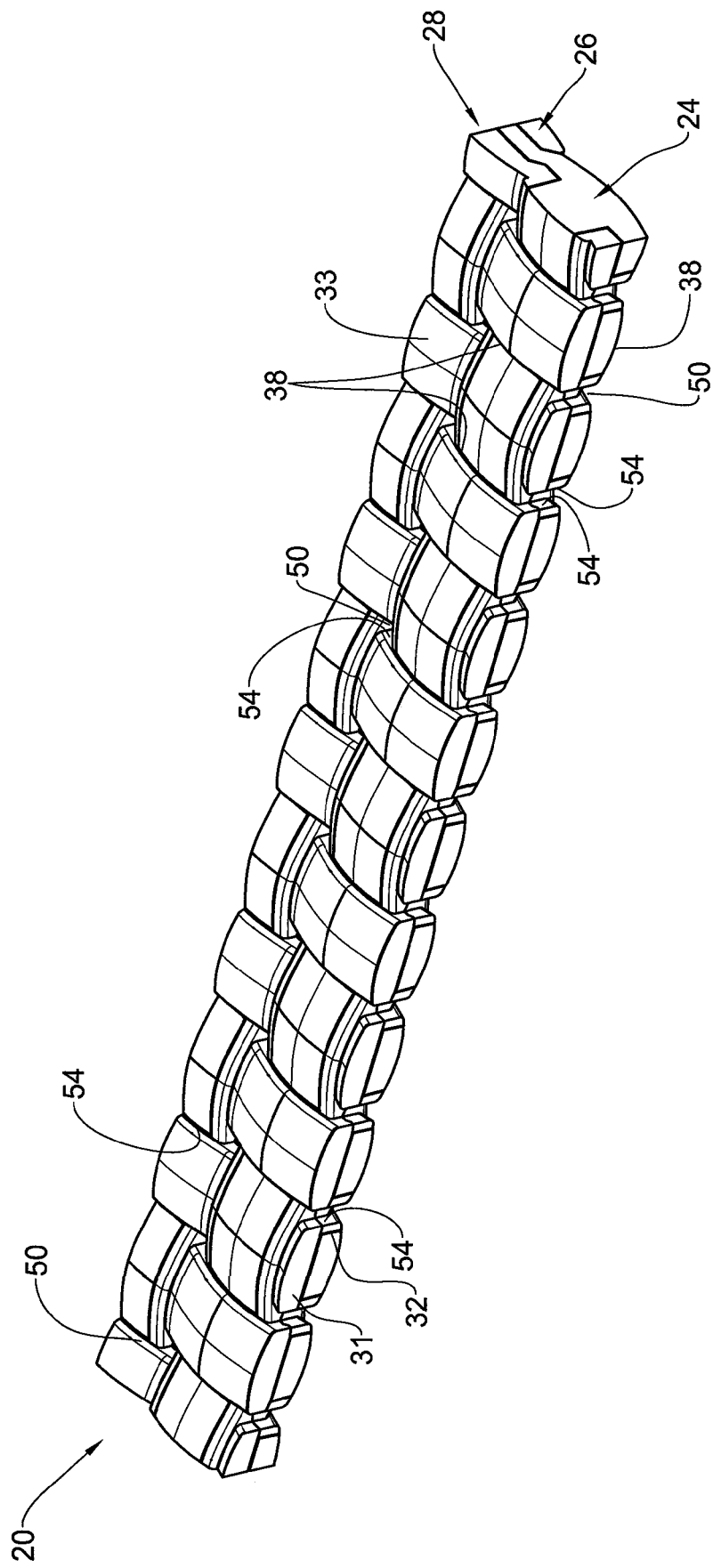
FIG. 6A is a perspective section taken along line VI-VI in FIG. 1A.
Figure 6B:
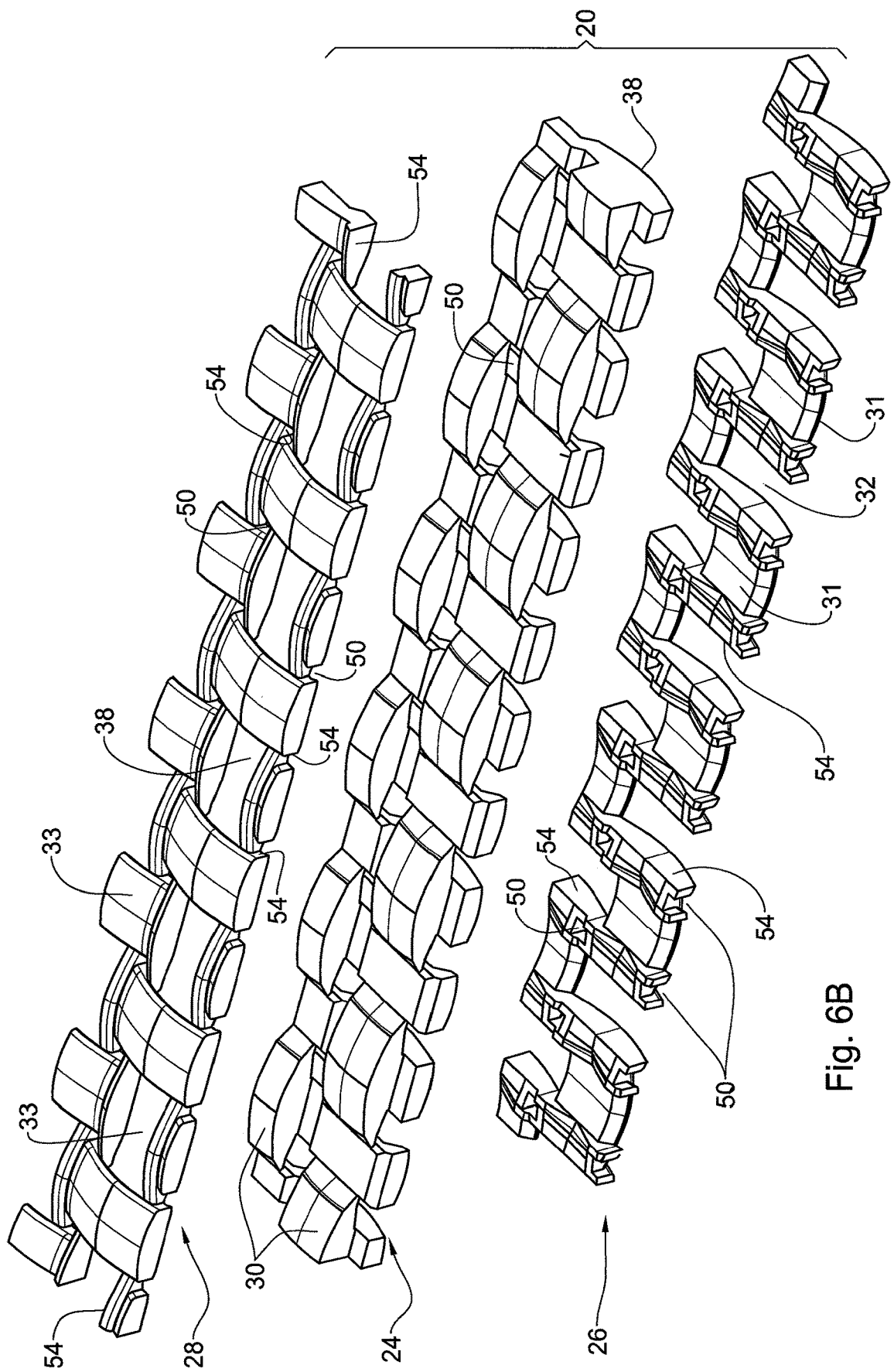
FIG. 6B is an exploded view of FIG. 6A.
Figure 7A:
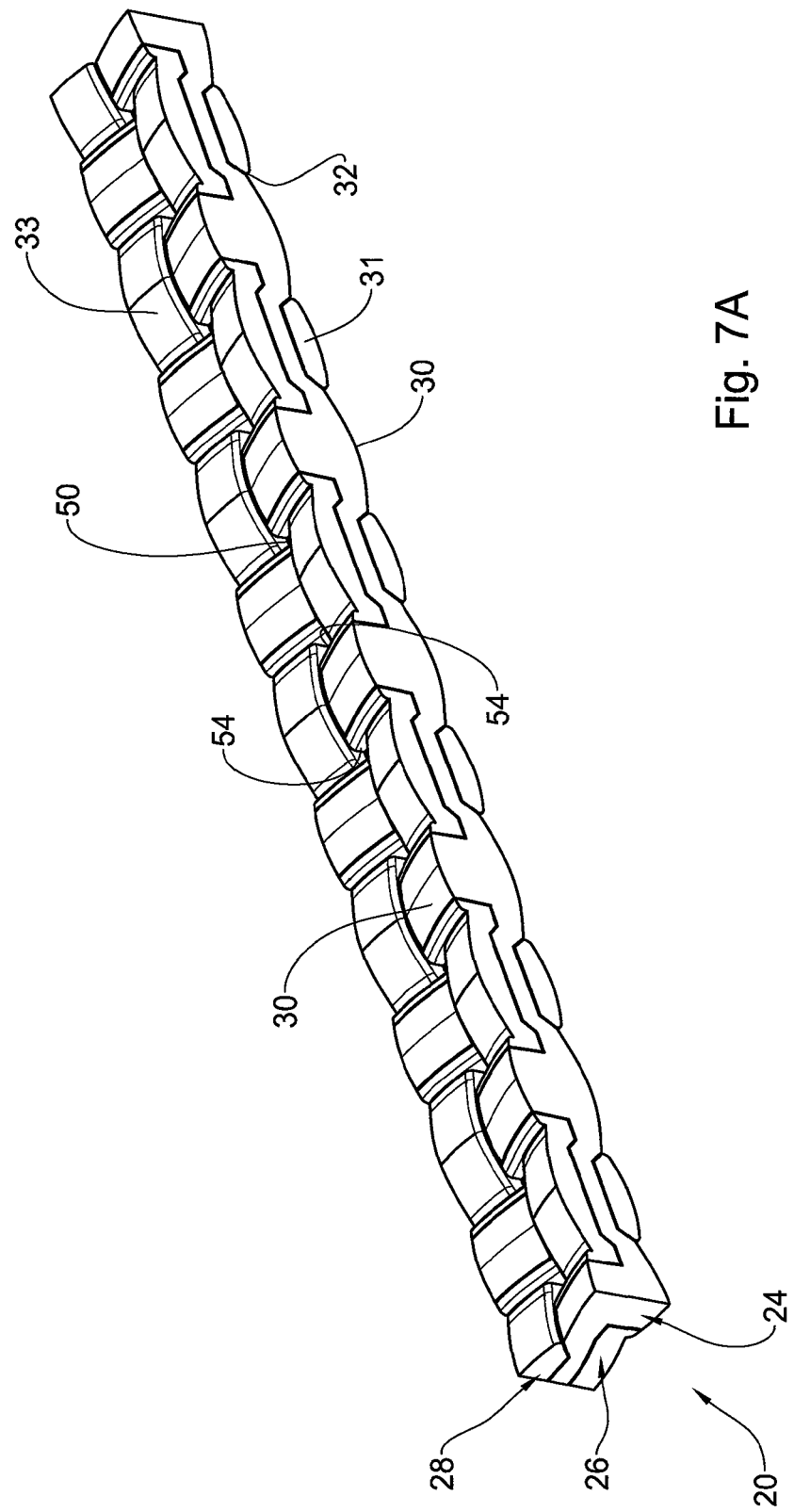
FIG. 7A is a perspective section taken along line VII-VII in FIG. 1A.
Figure 7B:
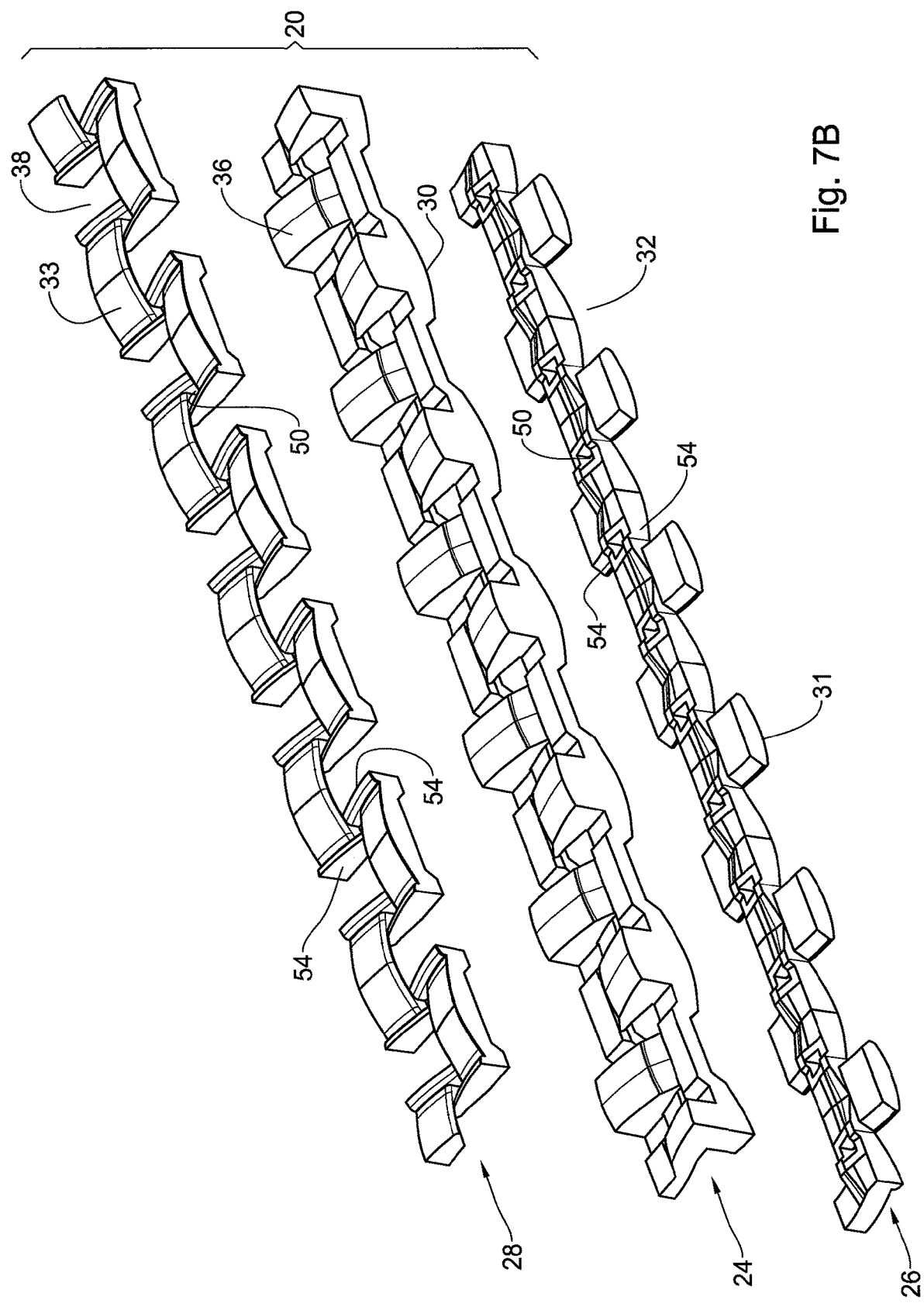
FIG. 7B is an exploded view of FIG. 7A.
Figure 8A:
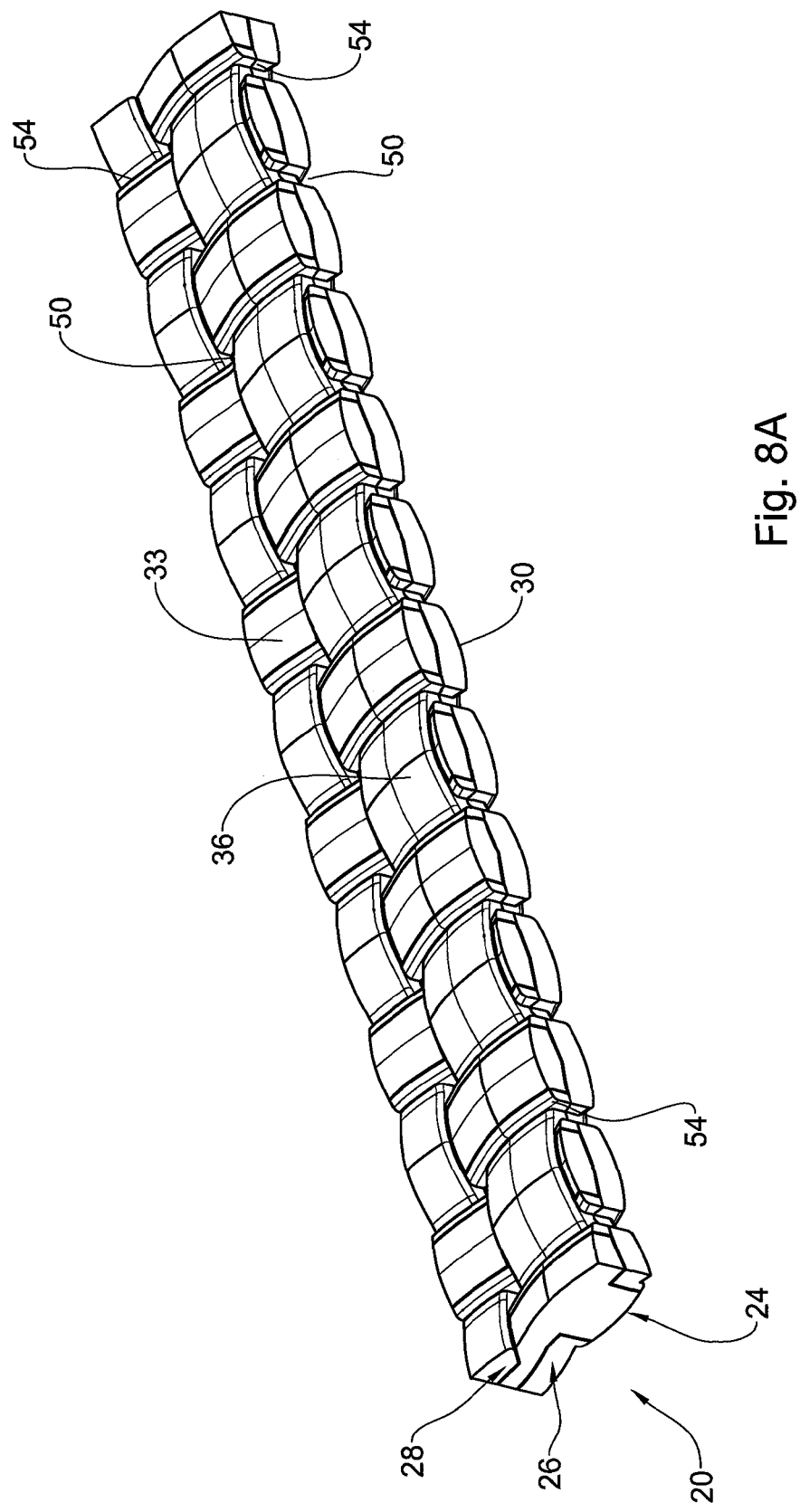
FIG. 8A is a perspective section taken along line VIII-VIII in FIG. 1A.
Figure 8B:
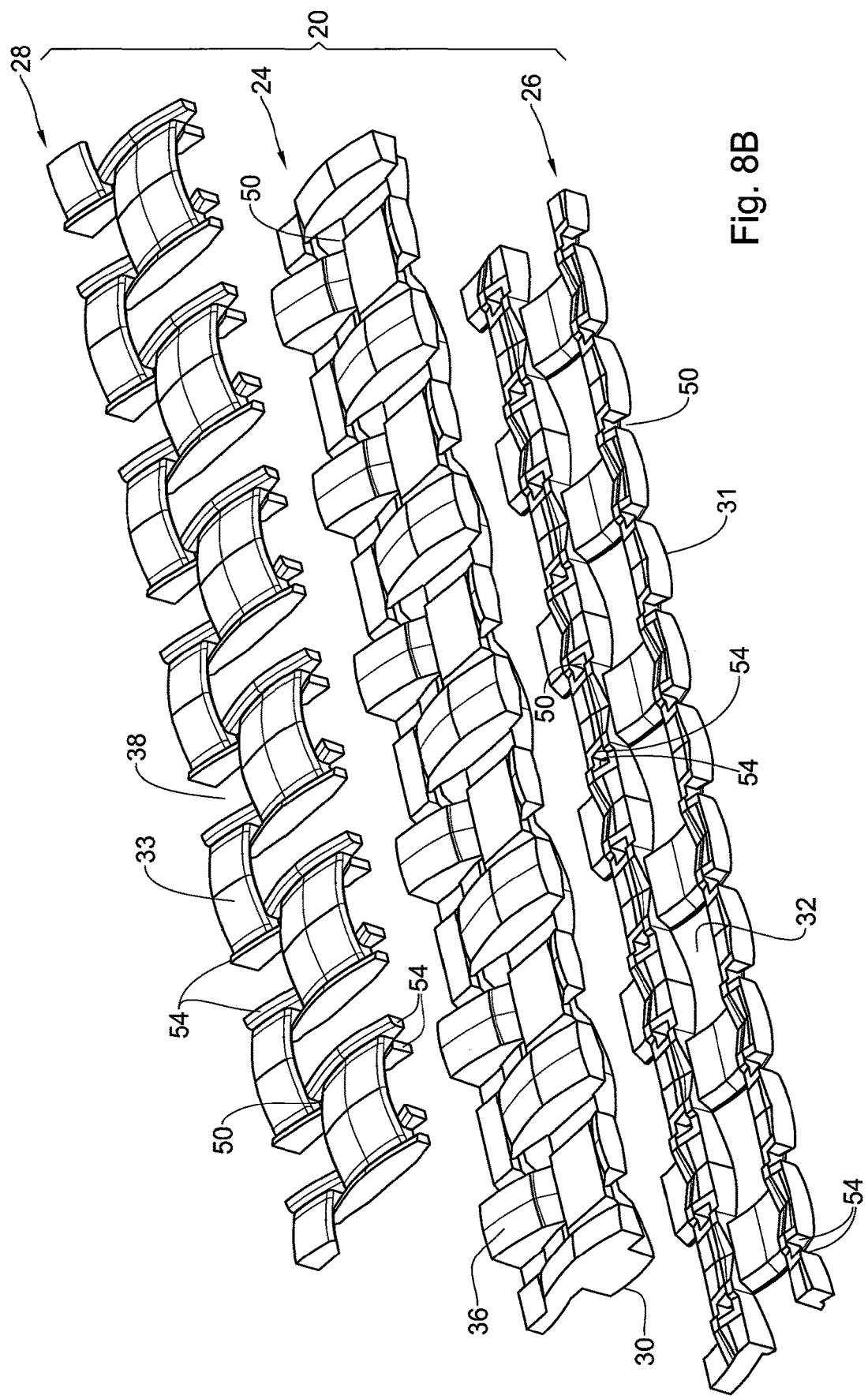
FIG. 8B is an exploded view of FIG. 8A.

Attention is first directed to FIGS. 1A to 1E of the drawings illustrating a panel portion generally designated 20, the panel resembling an interlace panel such as a wickerwork panel, and which in the present example is a flat, planar, rectangular element (as a mere example only, though any practical shape and size are configurable).

The panel 20 is injection molded in a process to be discussed hereinafter in greater detail.

With further reference being made also to FIGS. 2 to 8, it is appreciated that the panel 20 is a composite injected element comprised of three layers, namely a base layer 24, a first exterior layer 26 (a bottom layer in the illustrated drawings) and a second exterior layer 28 (a top layer in the illustrated drawings). The appearance is such that at the integrated position, top bulging portions 30 of the base layer 24 are alternating exposed through respective openings 32 of the first exterior layer 26, and bottom bulging portions 36 of the base layer 24 are alternatingly exposed through respective openings 38 of the second exterior layer 28. This arrangement can best be seen in the exploded views.

In the illustrated example the overall thickness of the base layer 24 is greater than the thickness of each of the first exterior layer 26 and the second exterior layer 28. Also, in the illustrated example the base layer 24 is of dark color, whilst the first exterior layer 26 and the second exterior layer 28 are of light color, thus imparting the panel 20 a classic warp and weft pattern.

Furthermore, it is appreciated that the base layer 24, the first exterior layer 26 and the second exterior layer 28 can have different external textures (mat, gloss, texturized, etc.), and the layers can also have different mechanical properties. For example, in case the panel is part of a solid container-like article (e.g. paper basket; not shown) the three layers 24, 26 and 28 can be made of the same material. However, in FIG. 2 there is illustrated a chair 40 fitted with a seat panel 42 and a backrest 44 both secured to the frame structure 46 of the chair 40, wherein the base layer is injected of a first material, substantially hard, whilst the first exterior layer 26 and the second exterior layer 28 are injected of more resilient materials (however injection adhereable to the base layer 24), thereby imparting the seat panel 42 and a backrest 44 with some resilience for comfort.

According to a particular example, the base layer can be made of a rigid material (e.g. PP—polypropylene), whilst one or both of the first exterior layer and the second exterior layer can be made of a more resilient material such as elastomeric materials (e.g. rubber or SEBS—styrene ethylene butylene styrene), imparting the panel with some flexibility. This can render it suitable, for example, for portions of furniture (e.g. seating and/or backing of a chair, etc.).

Figure 12:
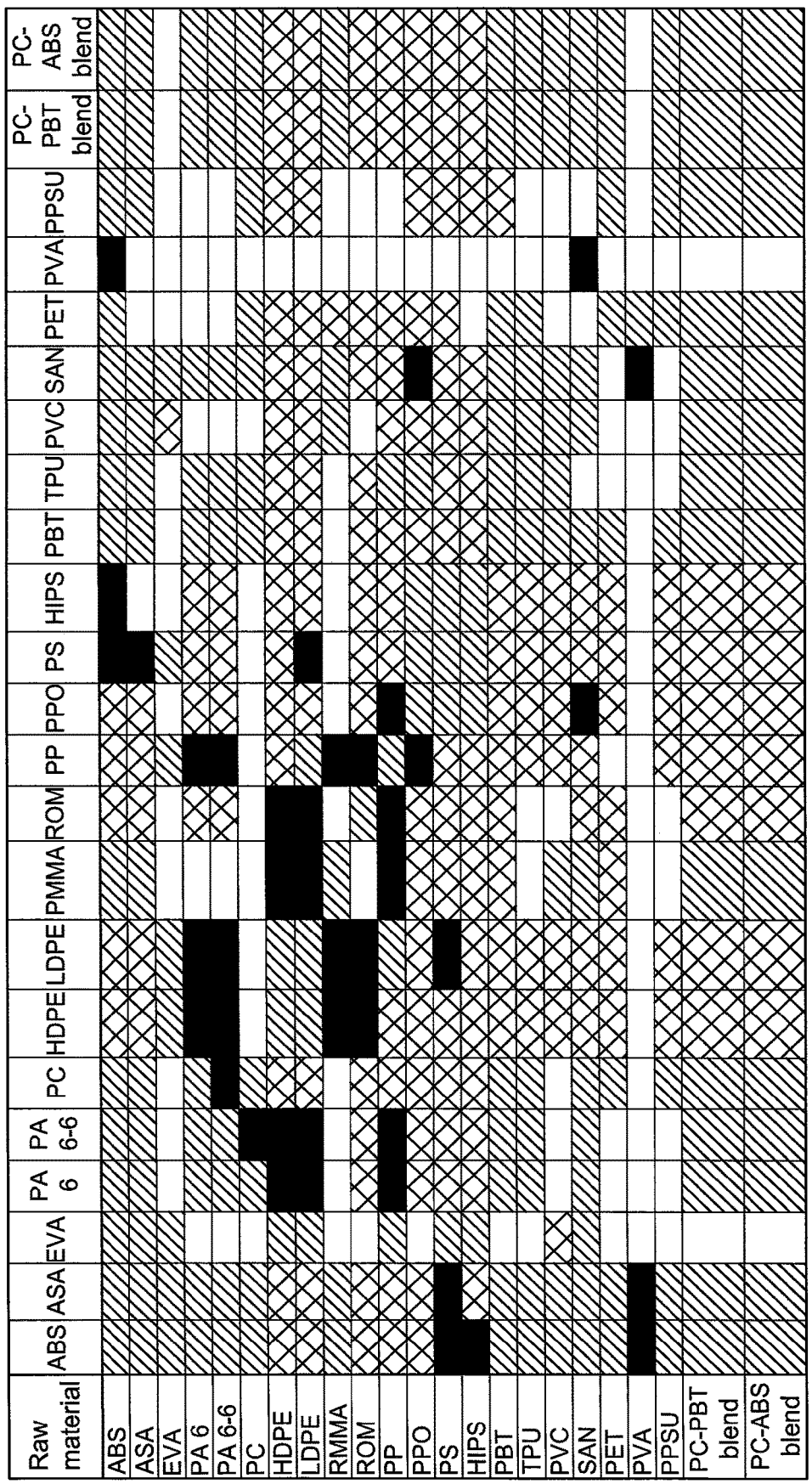
FIG. 12 is a table representing adhering properties of different materials, in a molding process.

FIG. 12 of the drawings is a table comprising a partial list of different materials and representing their adhesive by molding properties.

It is further noted that the panel 20 is configured with a plurality of apertures 50 ('see-through' openings) extending in register through the base layer 24 and sandwiching first exterior layer 26 and second exterior layer 28. The arrangement being such that each such aperture at the first exterior layer 26 and the second exterior layer 28 is defined between ribs of material 54 (best seen in FIG. 3D), said ribs 54 defining the boundaries of the openings 32, 38 and configured for flow of material during the injection molding process, so as to ensure homogenous and uniform flow of material to the solid portions 32 and 33, of the first exterior layer 26 and the second exterior layer 28, respectively.

The undulating pattern of the interlacing layers, together with the apertures and openings impart the panel 20 with a true feeling of a three dimensional wickerwork panel.

Figure 10C:
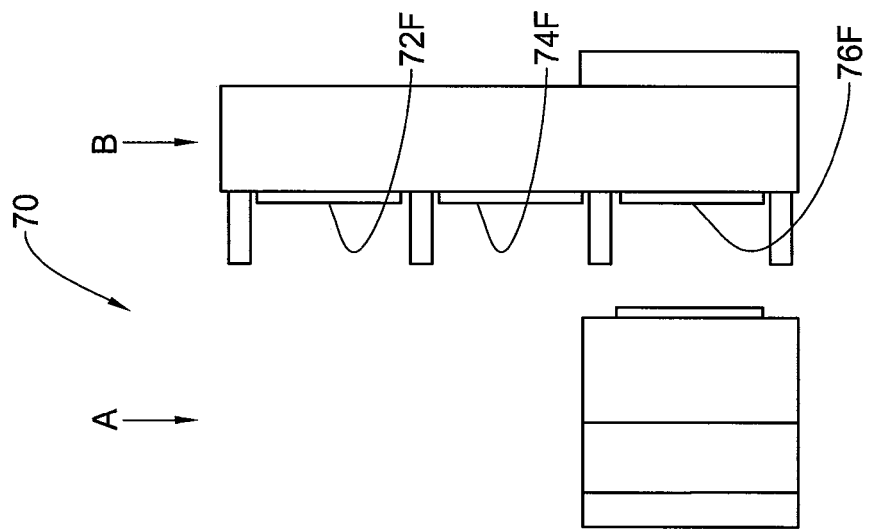
FIGS. 10A to 10C schematically illustrate consecutive steps in the method for molding a panel according to the disclosure.
Figure 10B:
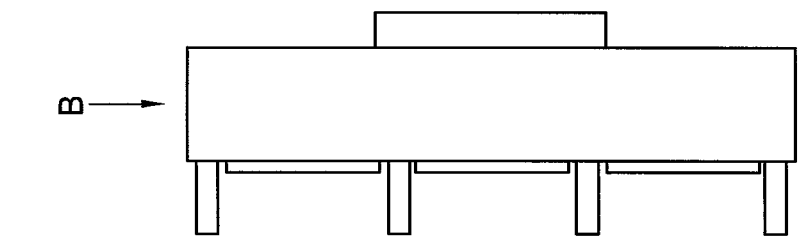
Figure 10A:
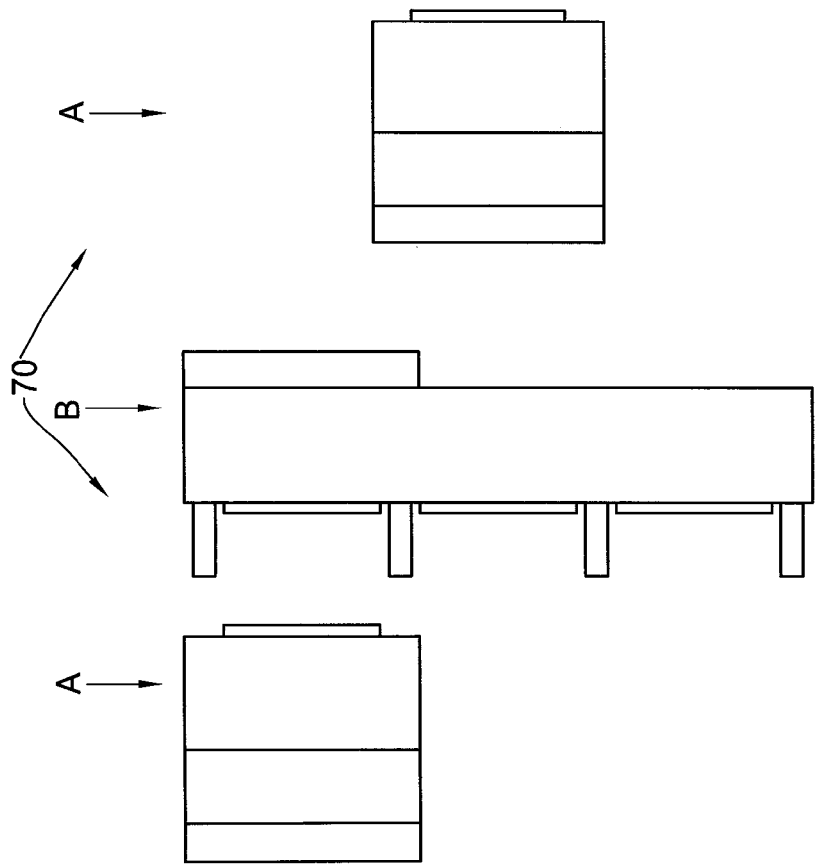
Figure 11B:
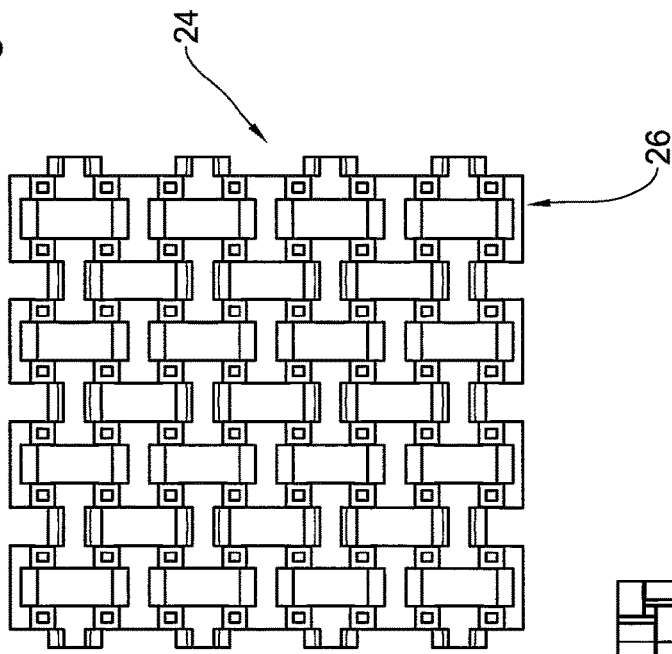
FIGS. 11A to 11C are resultant products of each step of the molding procedure.
Figure 11A:
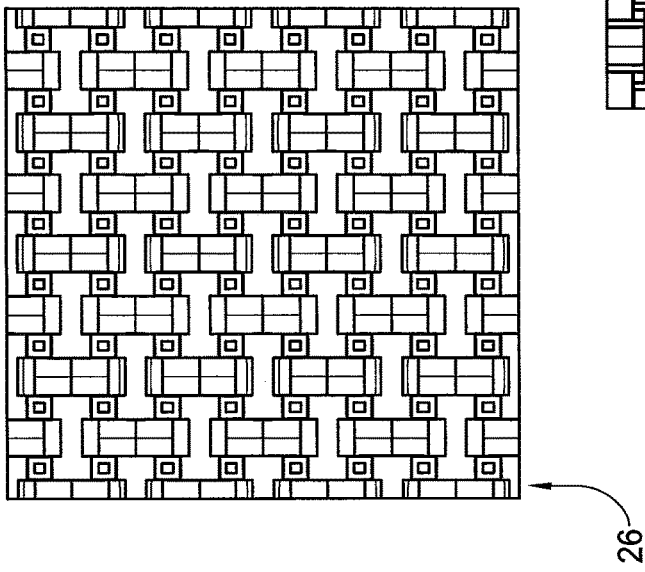
Figure 11C:
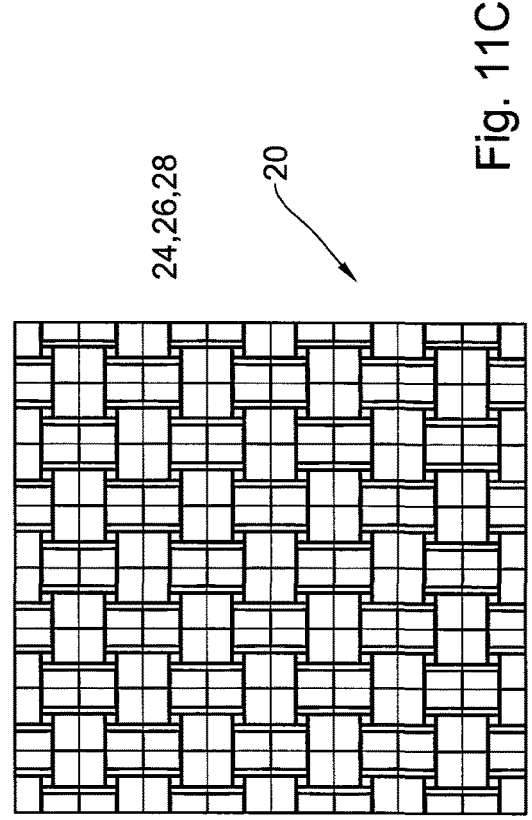

Turning now to FIGS. 9 to 11, reference is made to a method for manufacturing a panel 20 as disclosed hereinabove. The method, as disclosed in the annexed drawings, makes use of a revolving injection molding system, schematically represented and generally designated 70 and comprising a first section A and a second section B. The revolving injection molding system 70 comprises three molding trays designated 72, 74 and 76, each configured respectively with a male mold portion designated M and a female mold portion designated F.

The molding sequence takes place as follows:
a. first the mold 70 closes and material is injected into mold tray 72 for injection molding of the first exterior layer 26 (FIG. 11A);
b. the mold then opens, and with the first exterior layer 26 still in mold tray 72 of section B, section A of the mold revolves at 120°;
c. the mold 70 closes again and the base layer 24 is injected over the first exterior layer 26 in mold tray 74 (FIG. 11B);
d. the mold 70 then opens again, and section A revolves at 120° with the complex molded article now retained in section B;
e. the mold closes again and the third layer, i.e. the second exterior layer 28 is now injected over the base layer 24 in mold tray 76 (FIG. 11C);
f. simultaneously with step e) another base layer 24 is injected in mold tray 24 and another first exterior layer 26 is injected in mold tray 72;
g. the mold then opens, section A rotates again by 120° and a complete panel 20 is extracted form mold tray 76 of the mold 70;
h. steps a) to g) are repeated for injection of further panels.

Whilst the disclosure above refers to a revolving (rotary) mold, the same can be obtained also using a linear displaceable injection mold, mutatis mutandis.

The invention claimed is:

1. An interlace-like panel comprising a base layer having a first face and a second face, integrally sandwiched between a first exterior layer applied over the first face, and a second exterior layer applied over the second face, wherein each of the first face and the second face comprises outwardly projecting bulging portions, the bulging portions being exposed and extending in register through respective openings at the first exterior layer and the second exterior layer, wherein the respective openings are defined between bulges formed in each of the first exterior layer and second exterior layer, such that the bulging portions of the first face and the bulges of the first exterior layer and the bulging portions of the second face and the bulges of the second exterior layer are configured to create an appearance of a three-dimensional woven panel at a first external face and second external face of the interlace-like panel respectively, wherein a plurality of apertures extend in register through the base layer, first exterior layer, and second exterior layer between the bulging portions of the base layer and the bulges of the first exterior layer and second exterior layer.

2. The interlace-like panel of claim 1, wherein the base layer is made of a first material and each of the first exterior layer and the second exterior layer is made of either same or different materials comprising adequate adherence to the first face and second face of the base layer.

3. The interlace-like panel of claim 1, wherein the first exterior layer and the second exterior layer are interconnected through ribs facilitating flow of molten material during an injection molding process.

4. The interlace-like panel of claim 3, wherein the ribs extend between bulges of the first exterior layer and the second exterior layer.

5. The interlace-like panel of claim 3, wherein the ribs are boundaries of each of the apertures formed at each of the first exterior layer and the second exterior layer.

6. The interlace-like panel of claim 5, wherein each of the plurality of apertures at the first exterior layer and the second exterior layer is defined between the ribs.

7. The interlace-like panel of claim 1, wherein the bulging portions of the base layer are disposed over the first face and the second face at a uniform orientation or at a warp and weft orientation.

8. The interlace-like panel of claim 1, wherein the first exterior layer and the second exterior layer are identical and disposed in a back to back orientation.

9. The interlace-like panel of claim 1, wherein the first exterior layer and the second exterior layer are identical and rotated about an axis normal to a plane of the panel.

10. The interlace-like panel of claim 1, wherein the apertures are rectangular.

11. The interlace-like panel of claim 2, wherein adherence takes place through injection molding.

12. The interlace-like panel of claim 1, wherein the base layer, the first exterior layer and the second exterior layer have different physical or mechanical properties.

13. The interlace-like panel of claim 1, wherein the base layer is made of a rigid material, whilst one or both of the first exterior layer and the second exterior layer is made of a resilient material imparting the panel with some flexibility.

14. An article made of or comprising at least a portion of the interlace-like panel of claim 1.

15. A method for manufacturing the interlace-like panel of claim 1, carried out in an injection molding machine configured for three layer injection, the method comprising:
a. injecting the first exterior layer;
b. injecting the base layer over the first exterior layer, the first face of the base layer adheres to the first exterior layer; and
c. injecting the second exterior layer over the second face of the base layer.

* * * * *